United States Patent
Lo et al.

(10) Patent No.: US 11,509,627 B2
(45) Date of Patent: Nov. 22, 2022

(54) MAC MOBILITY FOR 802.1X ADDRESSES FOR PHYSICAL MACHINES

(71) Applicant: Arista Networks, Inc., Santa Clara, CA (US)

(72) Inventors: Alton Lo, Fremont, CA (US); Ian Andrew McCloghrie, Santa Clara, CA (US)

(73) Assignee: ARISTA NETWORKS, INC., Santa Clara, CA (US)

( * ) Notice: Subject to any disclaimer, the term of this patent is extended or adjusted under 35 U.S.C. 154(b) by 289 days.

(21) Appl. No.: 16/989,104

(22) Filed: Aug. 10, 2020

(65) Prior Publication Data

US 2022/0045988 A1    Feb. 10, 2022

(51) Int. Cl.
*H04L 9/40*         (2022.01)
*H04L 45/02*        (2022.01)
*H04L 101/622*      (2022.01)

(52) U.S. Cl.
CPC .......... *H04L 63/0254* (2013.01); *H04L 45/02* (2013.01); *H04L 63/0236* (2013.01); *H04L 63/0263* (2013.01); *H04L 63/0272* (2013.01); *H04L 63/0876* (2013.01); *H04L 63/162* (2013.01); *H04L 63/20* (2013.01); *H04L 2101/622* (2022.05)

(58) Field of Classification Search
CPC . H04L 63/0254; H04L 45/02; H04L 63/0236; H04L 63/0263; H04L 63/0272; H04L 63/0876; H04L 63/162; H04L 63/20; H04L 2101/622; H04L 63/0892; H04L 63/101
See application file for complete search history.

(56) References Cited

U.S. PATENT DOCUMENTS

| 7,079,537 | B1* | 7/2006 | Kanuri | H04L 49/602 370/469 |
| 7,735,114 | B2* | 6/2010 | Kwan | H04L 63/08 713/168 |

(Continued)

OTHER PUBLICATIONS

International Patent Application No. PCT/US2021/045102 dated Nov. 18, 2021;9 pages.

(Continued)

*Primary Examiner* — Cheng-Feng Huang
(74) *Attorney, Agent, or Firm* — Fountainhead Law Group, P.C.

(57) ABSTRACT

A system and method for provisionally authenticating a host moving from a source port of a switch device to a destination port of the switch device is disclosed. The host is initially authenticated at the source port and blocked from forwarding network traffic at the destination port. During a provisional authentication session, an authentication agent executing on the switch intercepts one or more authentication packets sourced by the host and headed for the destination port of the switch device and redirects the authentication packets to an authentication server for validating the host at the destination port of the switch device. The switch device removes the block at the destination port in response to receiving an acknowledgment of successful authentication at the destination port from the authentication server.

17 Claims, 26 Drawing Sheets

(56) References Cited

U.S. PATENT DOCUMENTS

| | | | | |
|---|---|---|---|---|
| 8,918,631 | B1* | 12/2014 | Kumar | H04L 63/00 |
| | | | | 370/254 |
| 10,484,380 | B2* | 11/2019 | Isola | H04L 63/1441 |
| 10,938,816 | B1* | 3/2021 | Belton, Jr | H04L 63/0892 |
| 11,038,887 | B2* | 6/2021 | Da Silva Peixoto | ........................ |
| | | | | H04L 63/101 |
| 11,063,940 | B2* | 7/2021 | Hemaraju | H04L 63/102 |
| 2003/0120915 | A1* | 6/2003 | Kleinsteiber | H04L 49/10 |
| | | | | 713/153 |
| 2005/0055570 | A1* | 3/2005 | Kwan | H04L 63/102 |
| | | | | 726/4 |
| 2005/0259654 | A1* | 11/2005 | Faulk, Jr. | H04L 61/00 |
| | | | | 370/392 |
| 2011/0197011 | A1* | 8/2011 | Suzuki | H04L 63/20 |
| | | | | 710/316 |
| 2011/0299413 | A1* | 12/2011 | Chatwani | H04L 49/70 |
| | | | | 370/254 |
| 2013/0091534 | A1* | 4/2013 | Gilde | H04L 63/20 |
| | | | | 726/13 |
| 2018/0013798 | A1* | 1/2018 | Pallas | H04L 12/4641 |
| 2019/0104127 | A1* | 4/2019 | Da Silva Peixoto | ........................ |
| | | | | H04L 63/1416 |
| 2019/0312887 | A1* | 10/2019 | Grimm | H04L 63/145 |
| 2019/0334894 | A1* | 10/2019 | Hemaraju | H04L 63/029 |
| 2020/0137055 | A1* | 4/2020 | Isola | H04L 63/101 |
| 2020/0213352 | A1* | 7/2020 | Fainberg | H04L 63/1466 |
| 2021/0351948 | A1* | 11/2021 | Lewis | H04L 41/12 |

OTHER PUBLICATIONS

Cisco. "Configuring IEEE 802.1X Port-Based Authentication." 802.1X Authentication Services Configuration Guide, Cisco IOS XE Release 3SE (Catalyst 3850 Switches). Jan. 16, 2018 (Jan. 16, 2018), 22 pages.

Congdon et al. "IEEE 802.1 X Remote Authentication Dial In User Service (RADIUS) Usage Guidelines" RFC 3580 (2003): 1-30. Sep. 2003 (Sep. 2003), 30 pages.

Related U.S. Appl. No. 16/989,107, filed Aug. 10, 2000.

* cited by examiner

| Address | VTEP A | VTEP B |
|---|---|---|
| M1 | Not present | Not present |

FIG. 12A

| Address | VTEP A | VTEP B |
|---|---|---|
| M1 | Port P1, Type 802.1x | Not present |

FIG. 12B

| Address | VTEP A | VTEP B |
|---|---|---|
| M1 | Port P1, Type 802.1x | VTEP A, Type EVPN remote authenticated |

FIG. 12C

| Address | VTEP A | VTEP B |
|---|---|---|
| M1 | Port P2, Type 802.1x | VTEP A, Type EVPN remote authenticated, |

FIG. 12D

| Address | VTEP A | VTEP B |
|---|---|---|
| M1 | Port P2, Type 802.1x | Port P10, Type 802.1x |

FIG. 12E

| Address | VTEP A | VTEP B |
|---|---|---|
| M1 | VTEP B, Type EVPN remote authenticated | Port P10, Type 802.1x |

FIG. 12F

MAC MOBILITY FOR 802.1X ADDRESSES FOR PHYSICAL MACHINES

BACKGROUND

The present disclosure relates to load balancing in computer networks.

BRIEF DESCRIPTION OF THE DRAWINGS

The various objects and advantages of the disclosure will be apparent upon consideration of the following detailed description, taken in conjunction with the accompanying drawings, in which like reference characters refer to like parts throughout, and in which:

FIGS. 12A-12F show examples of states of a forwarding table entry, in accordance with some embodiments of the disclosure;

DETAILED DESCRIPTION

Figure 1:
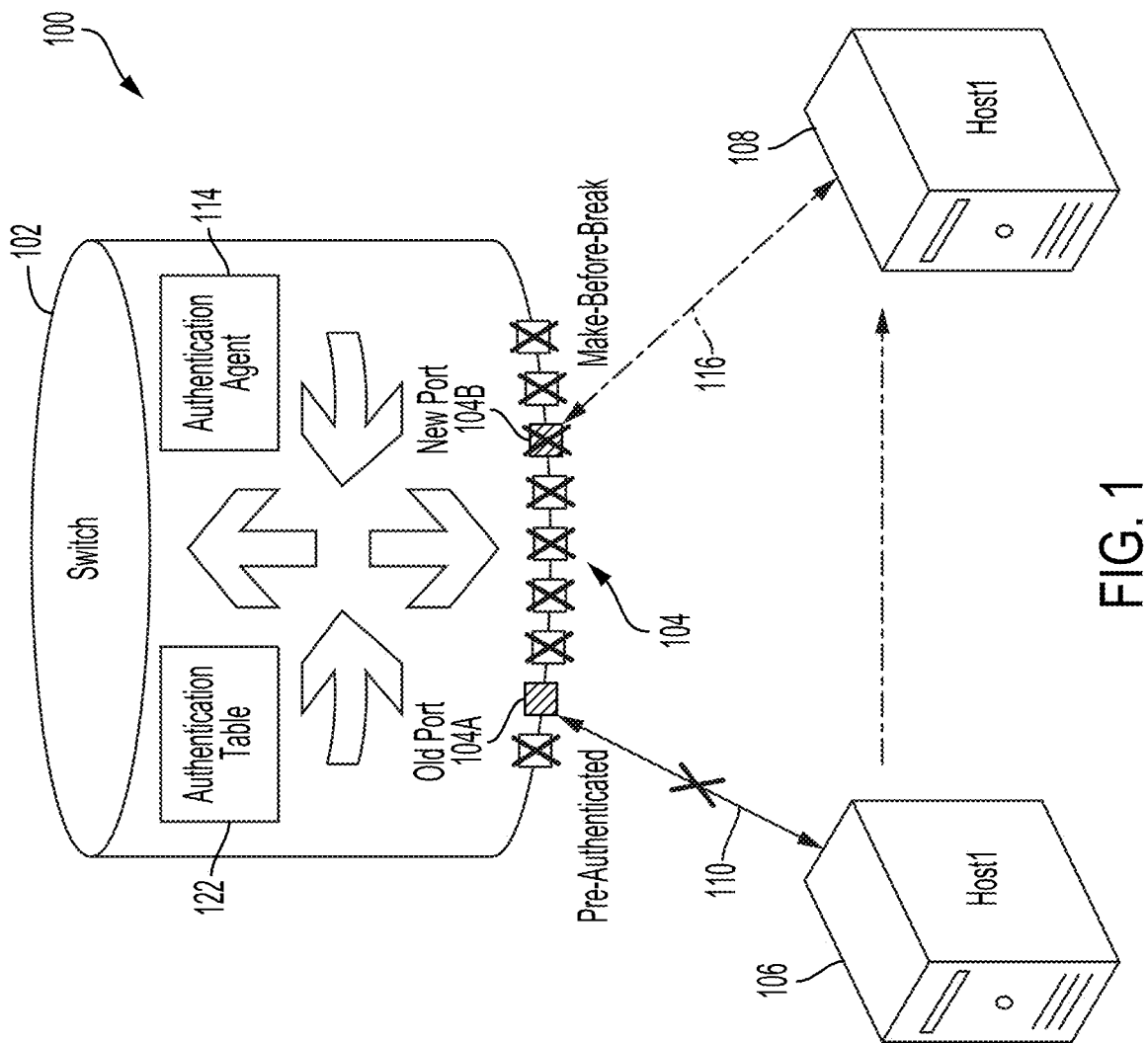
FIG. 1 is an illustrative block diagram of an example network system, in accordance with some embodiments of the disclosure.

Intra network devices, such as computer and notebook devices, and servers, enjoy free inter network device, such as a Layer 2 switch, port-to-port movement within a network. In certain modes of certain secure networks for robust secure communication, however, even if pre-authenticated, intra network devices may be prohibited from making a similar move, e.g., from an existing switch port to a new switch port (a local-to-local move), prior to reauthenticating at the new port. Analogously, a virtual inter network device, such as a virtual machine, may not be free to move from one virtual switch to another virtual switch (a local-to-remote move) without reauthentication at the latter switch despite pre-authentication at the former switch. In another virtualization context, a physical network device may be similarly limited in movement from a virtual switch port to another virtual switch port (a local-to-local move) even when pre-authorized at the former port without subsequent reauthorization at the latter port.

Secure networks generally conform to network protocols of defined-industry standards, an example of which is the industry-adopted IEEE 802.1x and WIFI (with or without encryption) standards. Noteworthy, the 802.1x standard was in part adopted to enhance network security, such as in data center clouds, by preventing certain bad actor scenarios. The all too commonplace practice of Media Access Control (MAC) address spoofing, also known as a "denial of service attack", exemplifies the incentive behind adopting the 802.1x protocol. Denial of service attacks cause collisions between distinct sets of intra network devices, such as virtual host machines, with a common MAC address and between inter network devices, such as physical and virtual switches, with a common MAC address on a common network switch.

MAC address spoofing (or denial of service attack) is perhaps best appreciated by the following bad actor example. Suppose a business entity conference room is equipped with multiple switch ports, all routed to a common switch. The switch ports provide authorized conference room attendee devices, such as pre-authenticated computers, servers, and iPad devices, of conference room attendees with portable access to the remaining network devices of a shared network when attendee devices are plugged into the switch ports. To recognize an authenticated device, the switch, or a remotely located inter network device, may compare a MAC address, uniquely identifying the authenticated device, with a list of known MAC addresses, each uniquely identifying a respective authenticated device of the shared network. The device may be successfully authenticated based on a positive MAC address comparison outcome. Now suppose a bad actor, Mr. Deceitful, plugs his unauthorized notebook into a conference room switch port and spoofs Mr. Honest's authenticated laptop MAC address effectively disguising his notebook as Mr. Honest's laptop to gain unauthorized access to the network traffic intended for Mr. Honest. Mr. Deceitful is clearly engaging in wrongful and potentially dangerous interference with network traffic by spoofing an authenticated device MAC address. Pre-802.1x, fooled by the spoofed MAC address, the switch would have likely failed to notice that Mr. Deceitful's notebook is in fact not Mr. Honest's laptop, happily forwarding packets intended for Mr. Honest to Mr. Deceitful. Certain features of the 802.1x standard were adopted to prevent precisely this type of bad actor scenario, among others, by requiring inter network device re-validation with each inter network device movement.

To guard against bad actor scenarios, some network security protocols, like IEEE 802.1x, require authentication of an inter network device before allowing the inter network device to reliably communicate with remaining inter network devices of a shared network. As previously noted, in certain modes, the 802.1x protocol requires the added security measure of reauthenticating an inter network device each time, without exception, the device desires to forward network traffic through a different physical or virtual switch port and further requires the added stringent measure each time an intra network device desires to forward network traffic through a different virtual switch despite prior authentication at a current virtual switch. Similarly, reauthentication is a perquisite to forwarding network traffic when a physical device attempts to move from a current virtual switch to a different virtual switch. The network device is blocked from communicating with the remaining network devices of a shared local network through switch ports (physical or virtual) other than the pre-authenticated switch port. Intra network device movement as well as inter network device movement of a physical or a virtual device therefore both require device reauthentication despite pre-existing authentication as a prerequisite to a successful movement.

Host "authentication" on a physical or a virtual device port generally signifies: 1) packets from the host (e.g., server) are allowed onto the authenticated device port without experiencing packet drops, and 2) packets from the host are not allowed onto any other port of the host. That is, a "denial of access" is issued against all ports other than the authenticated port and a device attempting to move from port A to port B risks experiencing packet drops at port B prior to reauthenticating at port B.

In a conventional switch, a moving device first disconnects from port A and authentication of the device at port A is thereafter terminated by the switch and the device then moves from port A to port B. The device disconnection from port A may be noticed by the switch in one of three ways: a "link down" event on the port (physical disconnection of the device from the port), device "sign off" (software command-driven port disengagement), and time out. Typically, when a device physically disconnects from a port—"link down"—the switch takes notice of the device disconnection and terminates the previously granted authentication pre-disengagement from the port. But in typical applications, an intermediary hub is generally positioned between the device and the switch port, a relatively effective hurdle to a direct device-to-port connection. With the hub effectively acting as a barrier to the moving device, the switch fails to notice a device link down event. Accordingly, even in the face of physical device disconnection from port A, the switch effectively does not notice a link down on port A and knows of no device authentication removal at port A. Consequently, device movement to port B results in failed traffic forwarding attempts. Similarly, the switch fails to take note of a sign off event because no sign off command is issued by the device to the switch to disengage—an expected device action in the context of a switch port disengagement. The switch remains ignorant of the device disconnection and does not know to terminate the existing authentication session. In a timeout scenario, the switch presumes disengagement after the expiration of a predetermined time period of undetected device communication and terminates the existing authentication session assuming the device has disconnected. While a time out option for removing an existing device authentication is technically a viable authentication termination option, it is nonetheless an impractical one given the associated unreasonable delays for expiration of a time period, which while in some cases configurable, in some cases, can be 3600 seconds (1 hour).

As they do with physical port-to-port network device movement, existing security protocol-compliant networks may constrain virtual switch-to-virtual switch device movement and host-to-host movement in virtualized environments. In accordance with the IEEE 802.1x protocol, in an ethernet virtual private network (EVPN) environment, a pre-validated virtual machine, at a virtual extensible local area network (VXLAN) network tunnel endpoint (VTEP), for example, cannot move from a current VTEP to a new VTEP and expect to resume or start reliable communication through the new VTEP before re-validating at the new VTEP. Similarly, a pre-validated virtual machine cannot move from a current multiprotocol network switching (MPLS) network to a new MPLS network before re-validating at the new MPLS network. The same can be said of other encapsulation methods, such as Generic Routing encapsulation (GRP), Control and Provisioning of Wireless Access Points (CAPWAP), to name a few examples.

Existing networking practices, lacking in certain capabilities, fail to meet certain secure network protocol requirements. Take the case of a conventional virtual machine (VM) static entry into the new VTEP. The manual address configuration settings of static address entries grant static addresses one of the highest configuration priority rankings among their peers. While impressive, this very feature precludes statically addressed devices from protocol-compliant mobility because their priority ranking conflicts with address changes. Therefore, the priority ranking of static assignments coupled with stringent network authentication requirements restrict voluntary VM movement between and within VTEPs even in the face of pre-authentication.

On the other hand, conventional dynamic entry into a new VTEP can all too freely accommodate VM mobility to the new VTEP, but it does so at the risk of violating certain security protocols—an unacceptable outcome to private enterprises competing to meet privacy law compliances and customer privacy concerns. In a specific 802.1x mode, for example, independent multi-device authentication is a prerequisite to any VM-initiated movement from an old VTEP to a new VTEP but the new VTEP lacks knowledge of the VM pre-authentication status at the old VTEP and is equally ignorant of the requisite 802.1x protocol reauthentication at the new VTEP. Consequently, VM network traffic attempts at the new VTEP result in failed traffic forwarding because VM-sourced network traffic packets at the new VTEP will fail to reach their intended destination. Dynamic entry is therefore too permissive to meet the requirements of certain secure protocol modes. In summary, while static entries inherently lack the capability to accommodate proper virtual machine movement, dynamic entries are too permissive to meet some of the most robust security protocol requirements of certain network security protocol standards.

In disclosed non-virtualized embodiments and methods, movement of an intra network device, such as a computer, a notebook, or a server, is facilitated between ports of an inter network device, such as switch, by re-authenticating the intra network device at a new switch port. Port-to-port inter and intra network device mobility proves compliant with certain robust secure network protocol measures. For example, when alerted, a physical or virtual network switch may re-authenticate a pre-authenticated inter network device (physical or virtual) at an existing switch port in part facilitated by an authentication agent executing on the switch, at a different switch port. In a non-virtualized network, for example, the authentication agent central to the switch, may be responsible, in large part, for the entire port-to-port authentication process. In a virtual switch device move, the authentication agent of the destination switch may be responsible for initiating reauthentication of the moving device at the destination switch.

The switch may receive an acknowledgment or notification from an authentication host in response to successful completion of a new port reauthentication. In such cases, the switch may update the device-port association of the pre-authenticated network device at the old port (or switch) in a corresponding forwarding table with an association of the reauthenticated network device at the desired port (or switch). Instead of replacing the association, the switch device may remove the old association from the forwarding table entirely and add the new association to the forwarding table.

Various embodiments and methods of the disclosure include a system for provisionally authenticating a device desirous of moving from one physical switch port to another physical switch port or from one physical switch to another physical switch. A software-based mechanism achieves port-to-port and switch-to-switch migration, sending packets to a different switch port or a different switch without packet loss risk. In some embodiments, namely, virtual device moves, the authentication (e.g., 802.1X) semantics are preserved across a wider overlay network with a combined EVPN environment and a network protocol authentication (e.g., 802.1X). For example, the system can extend EVPN to carry the notion of a "secure" MAC address—a pre-authenticated device address at a source device or port—between routers.

In accordance with disclosed provisional authentication methods, an authentication agent of a destination device has added responsibilities relative to conventional approaches. In effect, the destination device authentication agent facilitates a software-based authentication procedure in lieu of a conventional hardware-based approach, such as physical unplugging (e.g., link down, sign off, and time out) procedures, as earlier discussed. Accordingly, no timeout expiration period for disconnecting with the moving device is awaited by the source device. In some embodiments, the authentication agent executing on a switch initiates a provisional authentication session (a new session) to effect reauthentication of the moving device at an unauthenticated switch port. It is within this context that the embodiments of FIGS. 1 and 3-10 are discussed subsequently below.

In contrast to a non-virtualized port-to-port hop, in a virtualized network, orchestration of an intra network device-to-intra network device (e.g., virtual switch-to-virtual switch) authentication process may be a shared activity between the two devices. In effect, the two intra network device engagement begins with the source intra network device assuming the lead role and ultimately giving it up to the destination intra network device in response to successful reauthentication at the destination intra network device The existing authentication session at the source device remains opaque to the destination device to reduce additional and unnecessary destination device duties.

For example, a host (e.g., virtual machine) desires to join a new hypervisor (destination hypervisor) connected to destination switch device at which the host is unauthenticated, nevertheless, the host is initially authenticated at a source switch device and a part of a source hypervisor. Initially, the host is physically moved from the source switch device to the destination switch device, but the two switches are not necessarily yet aware of the host move. The host forwards traffic—authentication packets—headed for the destination device which may serve as notification from the host for an endpoint-to-endpoint host hop (e.g., from the source device to the destination device). The source device advertises (e.g., in compliance with border gateway protocol (BGP)) an authentication route (e.g., Type 2) and in response to the advertised route, the destination device initiates a reauthentication session at the destination device. In response to the source device advertisement, the destination device may make a request of an independent authentication host similar to the authentication process described above in relation to physical port-to-port hops to authenticate the host at the destination device. The destination device takes over the moving host and informs the source device (e.g., BGP) accordingly. In response, the source device terminates the existing authentication session, wholly releasing the host to the destination device and updates its association maps accordingly. The device-to-device reauthentication process is therefore a shared responsibility between and carried out promptly by the source and the destination devices.

In both the non-virtualized and the virtualized processes, the reauthentication process prevents packet loss exposure. The authentication session handoff from one physical switch port to another physical switch port, from one physical switch to another physical switch, from a virtual switch port to another virtual switch port, or from a virtual switch to another virtual switch, is effectively one continuous process in each scenario with an initial authentication session continuing onto a subsequent session seamlessly and the initial session terminating only in the presence of a subsequent successful authentication.

In some virtual device movement cases, due to an inherent network traffic delay, from the time a moving device is authenticated by an authentication host at the destination and the source switch port (or source switch) receiving an updated message from the destination switch port (or destination switch) but before traffic is blocked at the source, authentication at the source switch port and reauthentication at the destined switch port overlap and the network device static address configuration is morphed into a dynamic address configuration. In response to reauthentication, the switch blocks communication between the network device and local network devices through the source switch port and the network device address configuration becomes static again.

In some embodiments, after a moving device has physically moved but before the moving device has been reauthenticated, a source network device advertises a route through a network, such as an EVPN with border gateway protocol (BGP), to a destination network device. The advertised route includes a payload with an authentication extension signaling an authentication type using a new extended community. The authentication extension is programmably extendable for universal accommodation of various industry standard protocols.

A system and method for reauthenticating a host moving from one BGP router to another BGP router is disclosed. A host is initially authenticated at the first BGP router, for example, and free to communicate with other devices of the network to which the first BGP router belongs through the first BGP router but blocked from communicating with other devices of the network to which the second BGP router belongs through the second BGP router. The host is physically moved from the first BGP router to the second BGP router, a router to which the host is desirous to move but the two routers are unaware of the host move. This discovery is advertised to the second BGP router with a new extended community indicating authentication (or pre-authentication) of the host at the first BGP router. In response to the advertisement, an authentication session is consummated at the second BGP router. In response to a successful completion of the authentication session, the host is authorized to transmit network traffic on the second BGP router and subsequently blocked from doing the same at the first BGP router.

Networks are generally required to maintain network element connection associations, such as associations between MAC addresses and forwarding address ports for proper packet routing procurement between the network elements. For example, in a non-virtual network, a switch maintains associations between inter network devices and switch ports to which the inter network devices may be linked. Egress and ingress network traffic between the inter network devices is typically facilitated by use of one or more tables. For example, a layer 2 switch of a typical local area network (LAN) may maintain a forwarding table of associations between uniquely identifying authenticated inter network device MAC addresses and corresponding switch port identifiers.

In some embodiments, to facilitate a successful VM VTEP-to-VTEP move, respective VTEP forwarding tables, some of which may include an aggregate of software forwarding tables, are updated. What starts out as a "local" secure MAC address, identifying the VM at a forwarding table entry of the authenticated source VTEP port, is ultimately the subject of a "remote" secure MAC address table entry of the forwarding table of the source VTEP and what starts out as a "remote" secure MAC address, identifying the VM at an forwarding table entry of the unauthenticated destination VTEP port is ultimately the subject of a "local" secure MAC address of the destination VTEP forwarding table of the destination VTEP—a MAC mobility feature. In an example embodiment, the MAC mobility feature is 802.1x-compliant. It is understood however, that the MAC mobility feature may be compliant with other suitable networking authentication protocol standards.

In virtual networks, similarly, each of the source and destination hosts, hypervisors, for example, may maintain a similar address-to-host topology and each hypervisor may modify a respective table as discussed above relative to switch port movements.

Various disclosed embodiments and methods herein present reliable and robust networking authentication approaches and techniques to meet existing industry privacy concerns and adopted privacy governances. Be it in the physical space or the virtual space, some of today's strictest protocol authentication requirements are addressed by various disclosed embodiments and processes with robust system reliability achieved by enforcement of risk averse measures without undue reauthentication time delays. Reauthentication of a moving device is consummated at a desired destination device without packet loss. The system offers flexibility of movement from physical or virtual switch port-to-switch port and physical or virtual switch-to-switch by efficiently reauthenticating the moving device at each network stop. Features are built into the device movement process to avoid network device and architectural redesigns in favor of supporting legacy compatibility.

Applications of various disclosed embodiments and methods are large in number and wide in scope. Nonlimiting network applications include a network device moving between switch ports of a physical switch, between switch ports of a virtual switch, between virtual switch ports and between virtual switches. The network device movement may be within a network cloud, across network clouds, within a data center, across data centers, within a LAN, across LANs, within a WAN, across WANs, or among a heterogenous combination of networks.

In disclosed non-virtualized embodiments and methods, an inter network device may be a physical or a virtual switch, a router, or a switch with router capability or other suitable network devices capable of facilitating a network device movement with successful reauthentication at each network stop using reauthentication techniques of various embodiments disclosed herein. Nonlimiting examples of a moving network device are a computer, a notebook, tablet, smart devices, a router, and a server. In disclosed virtualized embodiments and methods, a network device move may make a move in an EVPN environment, for example, between a virtual switch (e.g., VTEP) or across virtual switches and between hosts and servers.

FIG. 1 is an illustrative example of a block diagram of a network system 100 implementing various disclosed inter network device reauthentication systems and methods. In accordance with some embodiments, network system 100 includes a network switch 102 arranged in a networking configuration to facilitate implementation of various device reauthentication techniques disclosed herein. In accordance with provisional authentication practices, network switch 100 facilitates prompt host port-to-port transfers in the absence of packet loss to achieve network performance optimization and robustness.

In FIG. 1, switch 102 is presumed a part of a network such as, without limitation, a local area network (LAN) or a wide area network (WAN). It is understood that the embodiment of FIG. 1 is merely a nonlimiting example of an inter network device with lossless port-to-port inter network device movement capability and other embodiments suitable for effecting similar port-to-port device transfers are contemplated. For example, switch 102 is an example of a network host device and may be replaced with any host device configurable with requisite features to effect successful and prompt device port transfers.

Referring still to FIG. 1, in accordance with various embodiments and methods of the disclosure, switch 102 includes switch ports 104, security agent 114, and forwarding table 122. In the interest of simplicity of illustration, the example scenario of FIG. 1, as explained below, is carried to subsequent embodiments shown in FIGS. 3-8. Switch 102 is an example of a network device and may be a layer 2 ("Layer 2") type of switch although switch 102 need not be a Layer 2 switch and may be a Layer 3 switch with router capabilities. A network host device, such as switch 102, implementing the authentication and provisioning functions of the disclosure, may operate at any suitable network layer.

Switch ports 104 are shown to include various ports among which are switch ports 104A and 104B. While switch 102 is shown to include 9 switch ports in each of FIGS. 1 and 3-8, it is understood that switch 102 or a host in general is not restricted to a limited number (for example, 9) ports and may instead have any number of ports. Switch 102 maintains associations between intra network devices and switch ports 104, in forwarding table 122 of Host1, to which the inter network devices may be linked for facilitating egress and ingress network traffic between the inter network devices. In some embodiments, table 122 may include or can be incorporated in or is a part of one or more other tables. In some embodiments, Host1 is an intra network device, a device outside of the network to which switch 102 belongs. In some embodiments, Host1 is an inter network device, positioned within a network common to switch 102.

In some embodiments, forwarding table 122 is a MAC address table, commonly referred to as a "Content Addressable Memory (CAM) table", used by switch 102 to determine where to forward traffic on a corresponding network. For example, assuming switch 102 to be a Layer 2 switch of a LAN, switch 102 may maintain associations between uniquely identifying authenticated network device MAC addresses and corresponding uniquely identifying switch port identifiers in forwarding table 122.

In some embodiments, security agent 114 is a software program, code, or routine that when executed carries out certain security authentication and reauthentication processes disclosed herein. Agent 114, when executed, typically manages all entries (or ports) of all inter network devices, such as switch 102, and determines which intra/inter network device, such as Host1, is authenticated on which port. But in the various embodiments and methods disclosed herein, agent 114 of switch 102, when executed by a switch processor, such as a central processor of switch 102, has the added responsibility of implementing a temporary session—provisional authentication.

For example, agent 114 may implement an 802.1x-compliant authentication session. Accordingly, agent 114 is not limited to executing processes for achieving compliance with the 802.1x protocol and can be programmed to carry out processes for meeting alternate networking authentication protocol requirements. Agent 114 is discussed herein primarily as a software program but agent 114 may, in part or in whole, carry out various authentication processes, as disclosed herein, in hardware. Still alternatively, agent 114 may direct another software- or hardware-based entity to carry out such processes.

For the purpose of simplicity of illustration, switch 102 is presumed a multiport Layer 2 switch configured to use MAC addresses to forward data at the data link layer of the open systems interconnection (OSI) model https://en.wikipedia.org/wiki/Data_link_layer. As earlier indicated, it is understood that switch 102 may be, for example, a Layer 3 switch with incorporated routing functionality configured to forward data at the network layer.

System 100 of FIG. 1 is further shown to include a Host1 initially connected to switch port 104A of switch 102 through link 110. Link 110 connects the nodes of the network of which switch 102 is a participating component. In the embodiment of FIG. 1, link 110 is a physical link although, link 116 may be a virtual link. Host1 may be initially connected to any of the ports 104 of switch 102. For purposes of discussion, Host1 is presumed connected initially to port 104A and by way of example, with aspirations to disconnect from port 104A and connect to port 104B of switch 102 through a link 116 not yet established. Link 116, when established, connects the port 104B of switch 102 to Host1 in the example embodiment of FIG. 1. Analogously to link 110, link 116 may be a physical or a virtual link. In FIG. 1, for the purpose of discussion, link 116 is presumed a physical link.

Host1 may be any network device suitably configurable to perform various processes and functions of provisional authentication at switch 102 port to which Host1 wishes to attach, forwarding network traffic upon completion of authentication reliably and without experiencing packet loss. In FIG. 1, Host1 is labeled Host1 106 when attached via a link to port 104A labeled Host1 108 when attached via a link to port 104B. Host1 is similarly labeled in FIGS. 3-8.

In the example of FIGS. 1 and 3-8, Host1 is a server desirous to move from an existing authenticated connection to port 104A, of switch 102, to a new unauthenticated connection, at port 104B of switch 102. Initially and prior to making its move, Host1 is pre-authorized to communicate with switch 102 at port 104A. In some embodiments, pre-authorization includes successful authentication of Host1 at port 104A by an authentication server, such as without limitation, a Radius server. In some embodiments, initial authentication of Host1 106, at port 104A is accomplished through execution of agent 114 although authentication of Host1 106 at port 104A may be achieved by execution of other agents or hardware implementation, or a combination thereof. Regardless of who successfully authenticates Host1 106 and how Host1 106 is authenticated at port 104A, without proper authentication, switch 102 will not recognize packets sourced from Host1, at port 104A. In some cases, Host1 can be authenticated at a single port of switch 102 at a given time.

Switch 102 has hardware port entries (not shown), at each distinct corresponding port, programmable to block packet entry onto a corresponding port. In the configuration of FIG. 1, switch 102 has a hardware entry (not shown) at a location where port 104B would meet a physically connected (or attached) network device, such as Host1. The hardware entry at port 104B, marked by "X" in FIG. 1, is programmed by switch 102 to block packets from Host1 to switch 102 at port 104B. In FIGS. 1 and 3-8, the letter "X" designates a respective blocked port entry. For example, in FIG. 1, all but port 104A of switch ports 104 are blocked to incoming packets—unauthenticated—pre- and at the beginning of the provisional authentication process through to prior to the completion of the provisional authentication process, as will be discussed below. But even if hardware entries were programmed to allow reliable packet access through port 104B, conventional authentication processes would nevertheless fail because of packet drops. None of the three traditional mechanisms for breaking link 110 offers a practical and reliable authentication option, as previously noted, therefore, the existing authentication session carries on with no foreseeable new authentication session at port 104B. In accordance with various disclosed mechanism, a soft authentication process indeed facilitates a new authentication session (port 104B) with an end to the existing session (at port 104A) only after the new session is successfully established.

Switch 102 may be featured with the capability to program hardware port entries for programmably receiving or blocking traffic through a corresponding port. But typically, a port entry hardware mechanism is designed to punt authentication packets to an internal switch central processor. In various embodiments and methods of the disclosure, the switch authentication agent sits in a favorable position to intervene at this point, steering the authentication packets toward a software-driven new authentication session—a soft reauthentication approach—to prevent otherwise dropped packets. With continued reference to the above example, as further discussed relative to FIG. 4, in accordance with some embodiments and methods of the disclosure, authentication packets, such as without limitation, 802.1x packets, are steered around the hardware blocked entry at port 104B onto a provisional connection serving as a temporary tunnel to an independent authentication device. Pre-authentication, authentication packets are provided with an exclusive right of way at port 104B while non-authentication packets are kept out and authentication at port 104A remains uninterrupted. Successful authentication, as reported by the authentication server, triggers a Host1 move from port 104A to port 104B.

In association with the embodiments of FIGS. 1 and 3-8, forwarding table 122 maintains correspondences between authenticated network devices of a network, such as Host1, and corresponding switch ports of switch 102, such as ports 104, in a forwarding table, such as forwarding table 122. In response to completion of the authentication process, switch 102 determines the table entry for port 104A as obsolete, removes the entry for port 104A from forwarding table 122, and adds an entry to forwarding table 122 for port 104B corresponding to the destination and newly authenticated switch port. In some embodiments, switch 102 may replace an existing device-to-port 104A entry with the device-to-newly authenticated port entry. Switch 102 programs hardware port entries for ports 104A and 104B accordingly removing the block at port 104B to allow Host1 regular network traffic to the rest of the network through port 104B and blocking regular network traffic through port 104A. The provisional authentication process completes, and a successful make-before-break process is achieved. That is, link 110 remains in effect and Host1 remains authenticated at port 104A until provisional tunneling and successful authentication of the authentication packets is consummated. It is only after successful software authentication at port 104B that port 104A is blocked. Accordingly, regular packet traffic between Host1 at port 104B, through link 116, to the remaining network elements of the corresponding network can begin.

In summary, with continued reference to FIG. 1, switch 102 provisionally authenticates Host1 through authentication agent 114 executing on a processor of switch 102. But initially, pre-provisional authentication, Host1 is authenticated for regular traffic communication with remaining network devices of the network only at port 104A through link 110. A provisional authentication session starts when authentication packets from Host1 are intercepted and redirected by a software mechanism for authentication of Host1 at port 104B using an independent authentication device. Indeed, all ports 104 with the exception of port 104A are initially blocked to Host1 thereby preventing Host1 from forwarding network traffic to the remaining network devices. Agent 114 causes switch 102 to intercept authentication packets, e.g., 802.1x packets, sourced from Host1 and headed for port 104B. The authentication packets are directed by switch 102 to an authentication host device for reauthenticating Host1 during a new authentication session while the existing session remains to effect traffic flow to the remaining network devices through port 104B.

In some embodiments, as previously noted, device authentication at a particular switch port prevents authentication of the same device at another switch port. Stated differently, a device is authenticated at a single switch port at any given time and in turn, only a single switch port may have control of a device MAC address at any given time.

When receiving authentication packets from Host1, agent 114 facilitates soft authentication by causing switch 102 to send the received authentication packets to a remote authentication server. In response to receiving an acknowledgment of a successful authentication session from the independent authentication device can switch 102 program security policies on port 104B. Accordingly, and in contrast to traditional authentication processes, a provisionally connected port is linked up even though communication from Host1 to any other host, but the existing linked up port, on the network continues to be blocked.

Accordingly, while not possible previously, in the various embodiments and processes disclosed herein, the conventional authentication agent is extended to understand the new concept of a new session, at port 104B, taking over from the old session, at port 104A, a seamless reauthentication session. The packets during a period between the old session and the new session are intercepted by the authentication agent and instead of the process dropping the packets, the authentication packets are directed to an authentication server. In some embodiments, a precession state of authentication agent 114 is used to transfer authentication packets from Host1 108 (FIG. 1) to the authentication server. In response to receiving an authentication acknowledgment from the authentication server, agent 114 creates the requisite security policies.

Figure 2:
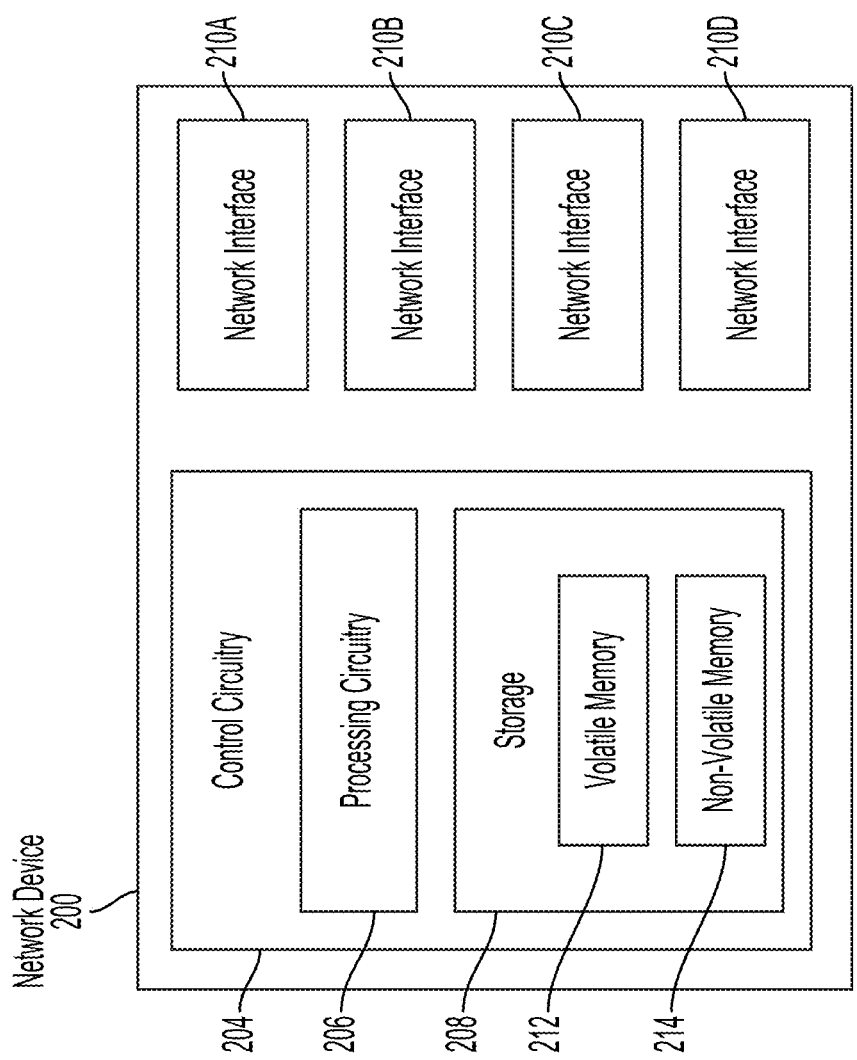
FIG. 2 shows a computing system implementation, in accordance with some embodiments of the disclosure.

FIG. 2 shows a generalized embodiment of a network device (or "network element") 200. As depicted, network device 200 may be a router, a switch, and/or any other network device configured to receive network traffic from a first device and forward the network traffic to a second device, such as by performing an address lookup in a forwarding table. Network device 200, in a virtual world, may be a virtual switch, such as without limitation, a VTEP effecting reauthentication in a local move or a local-to-remote move, as further described relative to subsequent figures. Those skilled in the art will recognize that switches 100 and 300-800 of FIGS. 1 and 3-8, respectively, may be implemented as network device 200. Network device 200 may receive network traffic (e.g., from Host1) via a network interface (e.g., link 110 or 116), such as network interface 210A, and provide the network traffic to control circuitry 204, which includes processing circuitry 206 and storage 208. While network device 200 is shown to include four network interfaces (e.g., network interfaces 210A, 210B, 210C, and 210D), this is merely illustrative, and it is contemplated that network device 200 may include any number of network interfaces, and that the network interfaces may be of any type of wired or wireless network interface, such as RJ45 ethernet ports, a coaxial ports, logical ports, wireless interfaces (e.g., 802.1x interfaces, WIFI, BLUETOOTH interfaces, cellular interfaces, etc.

Control circuitry 204 may be based on any suitable processing circuitry, such as processing circuitry 206. As referred to herein, processing circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, octa-core, or any suitable number of cores). In some embodiments, processing circuitry is distributed across multiple separate processors or processing units, for example, multiple of the same type of processing units (e.g., two INTEL CORE i7 processors) or multiple different processors (e.g., an INTEL CORE i5 processor and an INTEL CORE i7 processor). In some embodiments, control circuitry 204 executes instructions for provisional authentication and related operations, as described herein with reference to FIGS. 1 and 2-8. Control circuitry 204 may further consummate route advertisement, such as discussed relative to FIGS. 11-24, to other devices connected to network device 200.

Storage 208 may include volatile random-access memory (RAM) 212, which does not retain its contents when power is turned off, and non-volatile RAM 214, which does retain its contents when power is turned off. In some embodiments, storage 308 may be an electronic storage device that is part of control circuitry 204. As referred to herein, the phrase "electronic storage device" or "storage device" should be understood to mean any device for storing electronic data, computer software, instructions, and/or firmware, such as random-access memory, content-addressable memory, hard drives, optical drives, solid state devices, quantum storage devices, or any other suitable fixed or removable storage devices, and/or any combination of the same. In some embodiments, one or more forwarding tables 122, 322, 422, 522, 622, 722, 822, 1732, 1832, and table entries of FIGS. 12A-12F of respective FIGS. 1, 3-8, 17, 18, and 12A-12F are stored in storage 208. In some embodiments, one or more forwarding tables 122, 322, 422, 522, 622, 722, 822, 1732, 1832, and table entries of FIGS. 12A-12F of respective FIGS. 1, 3-8, 17, 18, and 12A-12F may be stored on a separate device and a link to forwarding tables 122, 322, 422, 522, 622, 722, 822, 1732, 1832, and table entries of FIGS. 12A-12F of respective FIGS. 1, 3-8, 17, 18, and 12A-12F may be stored in storage 208. In some embodiments, destination VTEP forwarding tables with depicted entries, such as shown relative to VTEP2 switch 1604, 1704, 1804, 1904, 2004, 2104, and 2204 of FIGS. 16-22, respectively, may be stored, in part or in whole, in storage 208, for example volatile memory 212. The circuitry described herein may execute instructions included in software running on one or more general purpose or specialized processors. Multiple circuits may be provided to handle simultaneous processing functions.

In some embodiments, storage 208 may maintain authentication agent program code. For example, program code for authentication agents 114, 314, 414, 514, 614, 714, 814, 1610, 1616, 1710, 1716, 1810, 1816, 1910, 1916, 2010, 2016, 2110, 2116, 2010, and 2016 may be stored in non-volatile memory 214 of storage 208.

In an embodiment, the network switch, physical or virtual, includes a processor, for example, processing circuitry 206, and memory, for example, memory 214. The processor executes program code stored in memory to implement the authentication agent and carry out provisional authentication processes from the time when the switch device starts to receive authentication packets, or a notification, from a mobile inter or intra network device to after successful reauthentication of the network device or after blocking the old port or after both events occur. A virtual switch of a destination host (e.g., a hypervisor) starts to receive authentication packets or a notification from a mobile intra network device and may successfully assist with or cause reauthentication of the intra network device.

Figure 3:
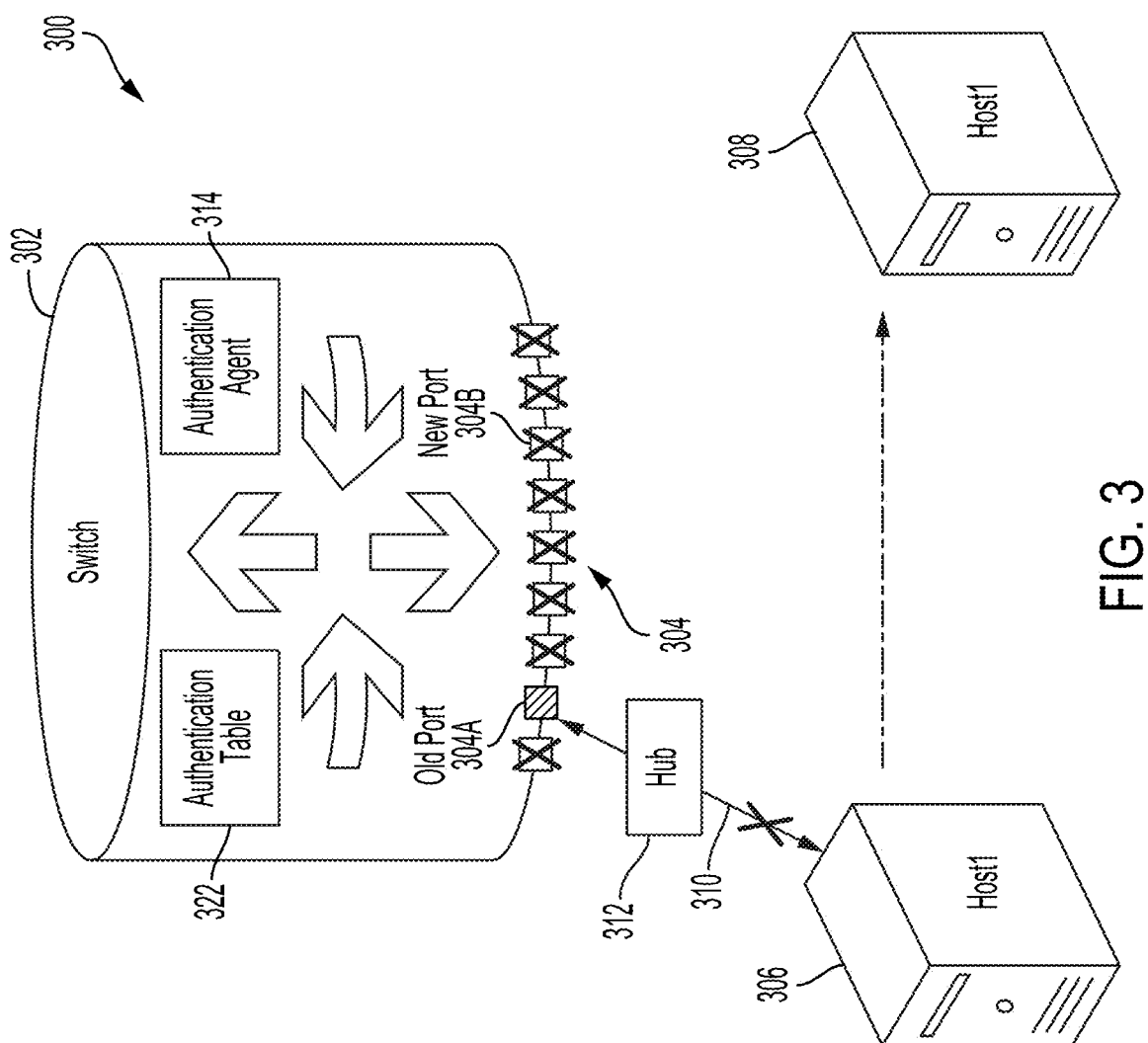
FIGS. 3-8 are illustrative block diagrams of example network systems, in accordance with some embodiments of the disclosure.

FIGS. 3-8 are illustrative block diagrams of an example network system, in accordance with some embodiments of the disclosure. Each of the FIGS. 3-8 illustrates the network system in a distinct state during a reauthentication process. FIG. 3 shows the reauthentication process relative to a network system 300, FIGS. 4-8 each show successive states of the reauthentication process relative to respective systems 400-800. The steps of the reauthentication process, which is analogous to the authentication process discussed with reference to FIG. 1, is now discussed relative to FIGS. 3-8.

FIGS. 3-8 each include a network device configured analogously to switch 102 of FIG. 1. For example, each of the switches 302, 402, 502, 602, 702, and 802 of respective FIGS. 3-8, is configured as switch 102. Similarly, in each of the figures, FIGS. 3-8, a host, Host1, is presumed to plan for migration from a pre-authenticated switch port of a corresponding switch to a different switch port of the same corresponding switch where the host is yet to be authenticated. In FIG. 3, Host1 begins its journey at 306, initially connected to port 302A, migrating to 308 to connect to port 304B; in FIG. 4, Host1 starts at 406 and is initially connected to port 402A, migrating to 408 to connect to port 404B; in FIG. 5, Host1 starts at 506 and is initially connected to port 502A, migrating to 508 to connect to port 504B; in FIG. 6, Host1 starts at 606 and is initially connected to port 602A, migrating to 608 to connect to port 604B, in FIG. 7, Host1 starts at 706 and is initially connected to port 702A, migrating to 708 to connect to port 704B; and in FIG. 8, Host1 starts at 806 and is initially connected to port 804A, migrating to 808 to connect to port 804B. Additionally, the switch in each of the FIGS. 3-8, is presumed an example Layer 2 switch. Each switch includes a number of corresponding switch ports. For example, in FIG. 3, switch 302 is equipped with switch ports 304 including switch ports 304A and 304B; in FIG. 4, switch 402 is equipped with switch ports 404 including switch ports 404A and 404B; in FIG. 5, switch 502 is equipped with switch ports 504 including switch ports 504A and 504B; in FIG. 6, switch 602 is equipped with switch ports 604 including switch ports 604A and 604B; in FIG. 7, switch 702 is equipped with switch ports 704 including switch ports 704A and 704B; and in FIG. 8, switch 802 is equipped with switch ports 304 including switch ports 804A and 804B.

Figure 4:
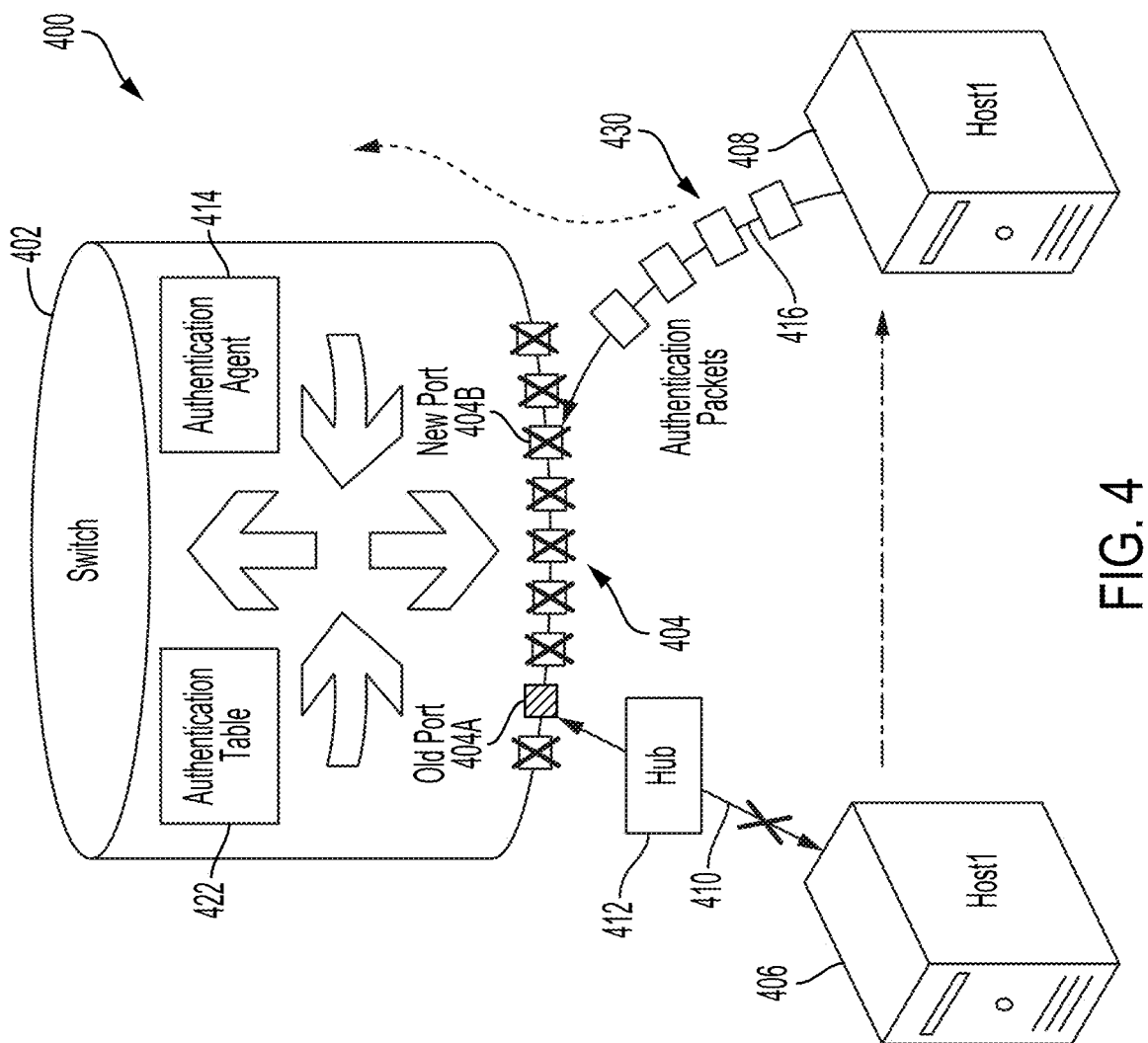
Figure 5:
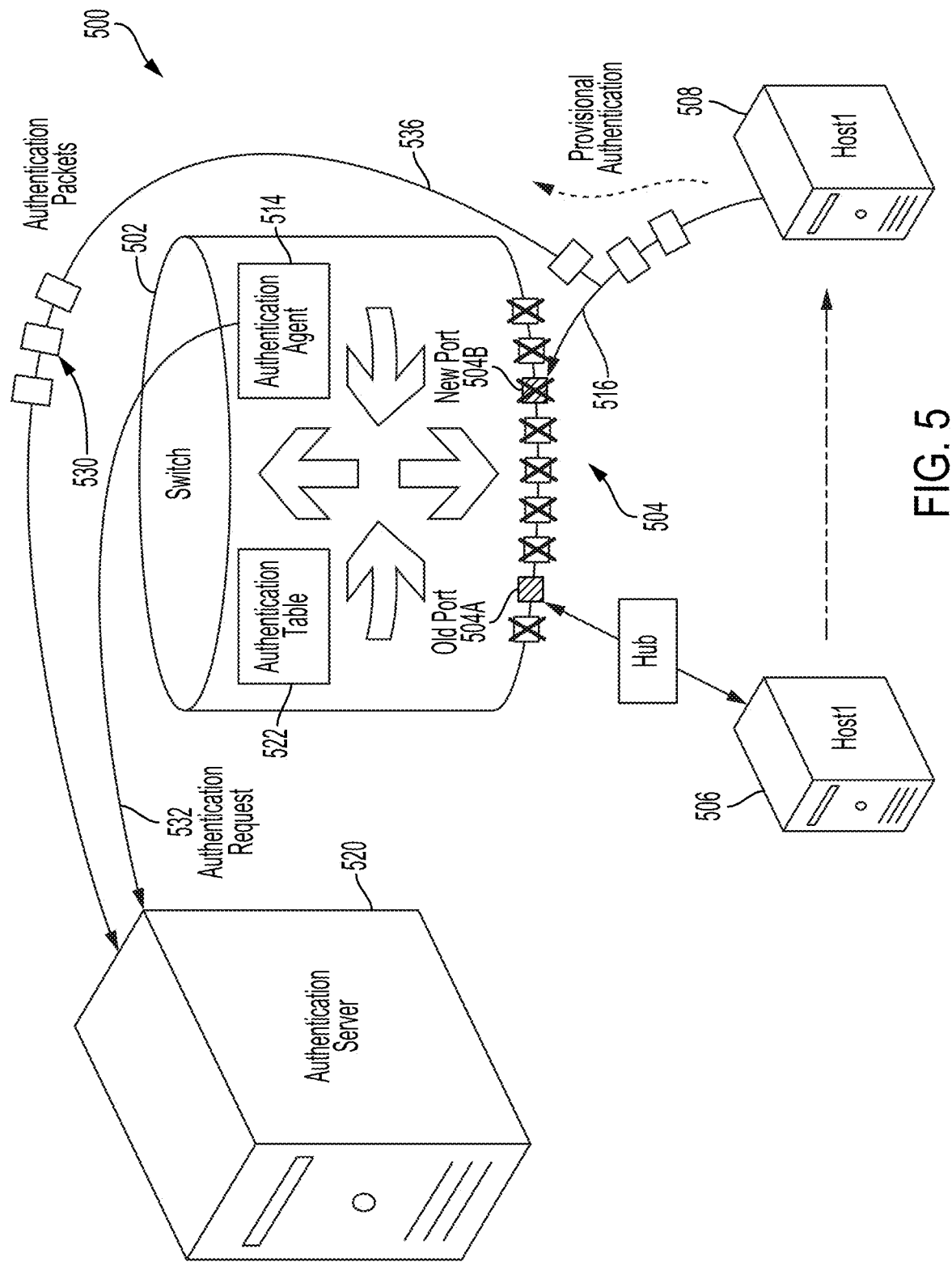
Figure 6:
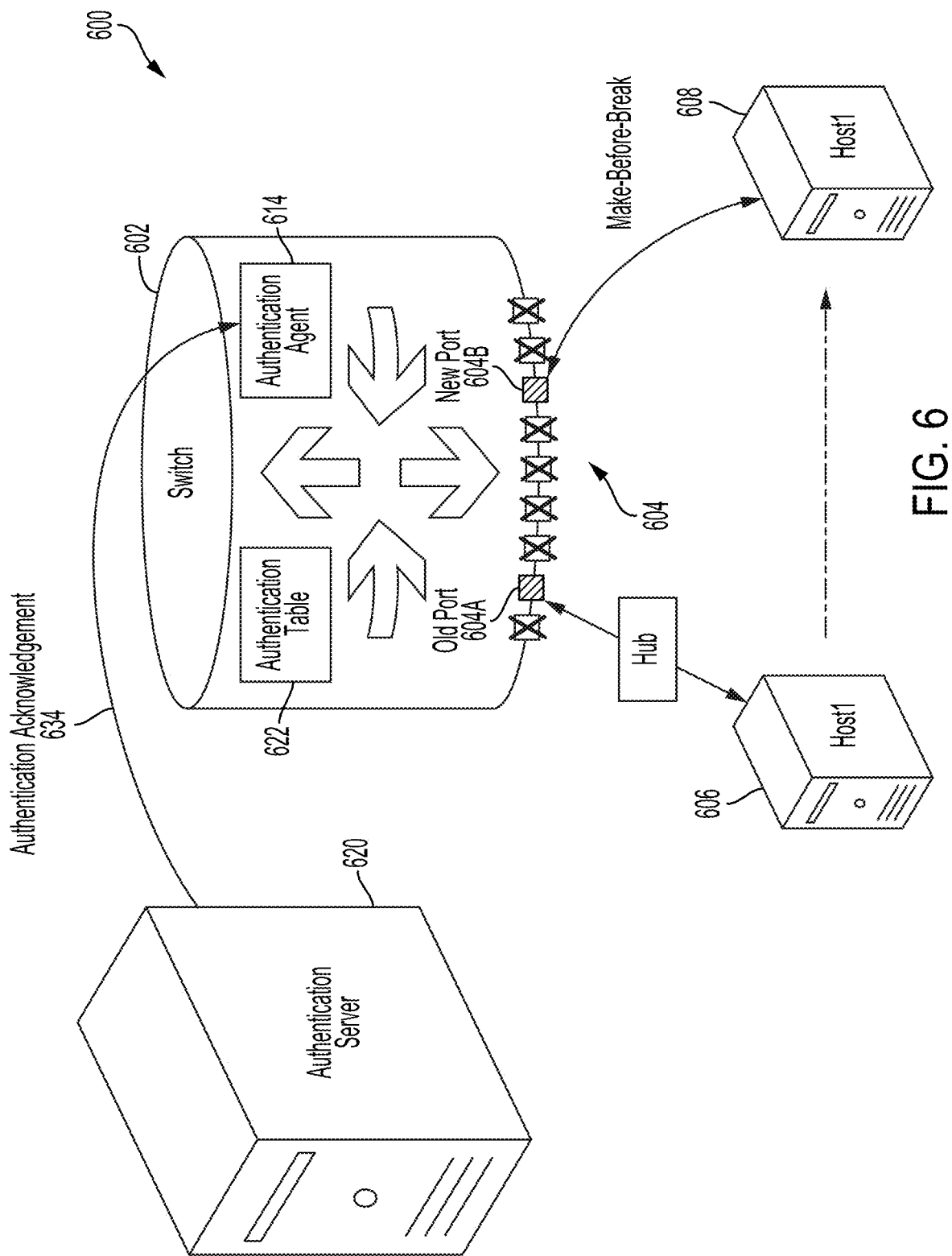
Figure 7:
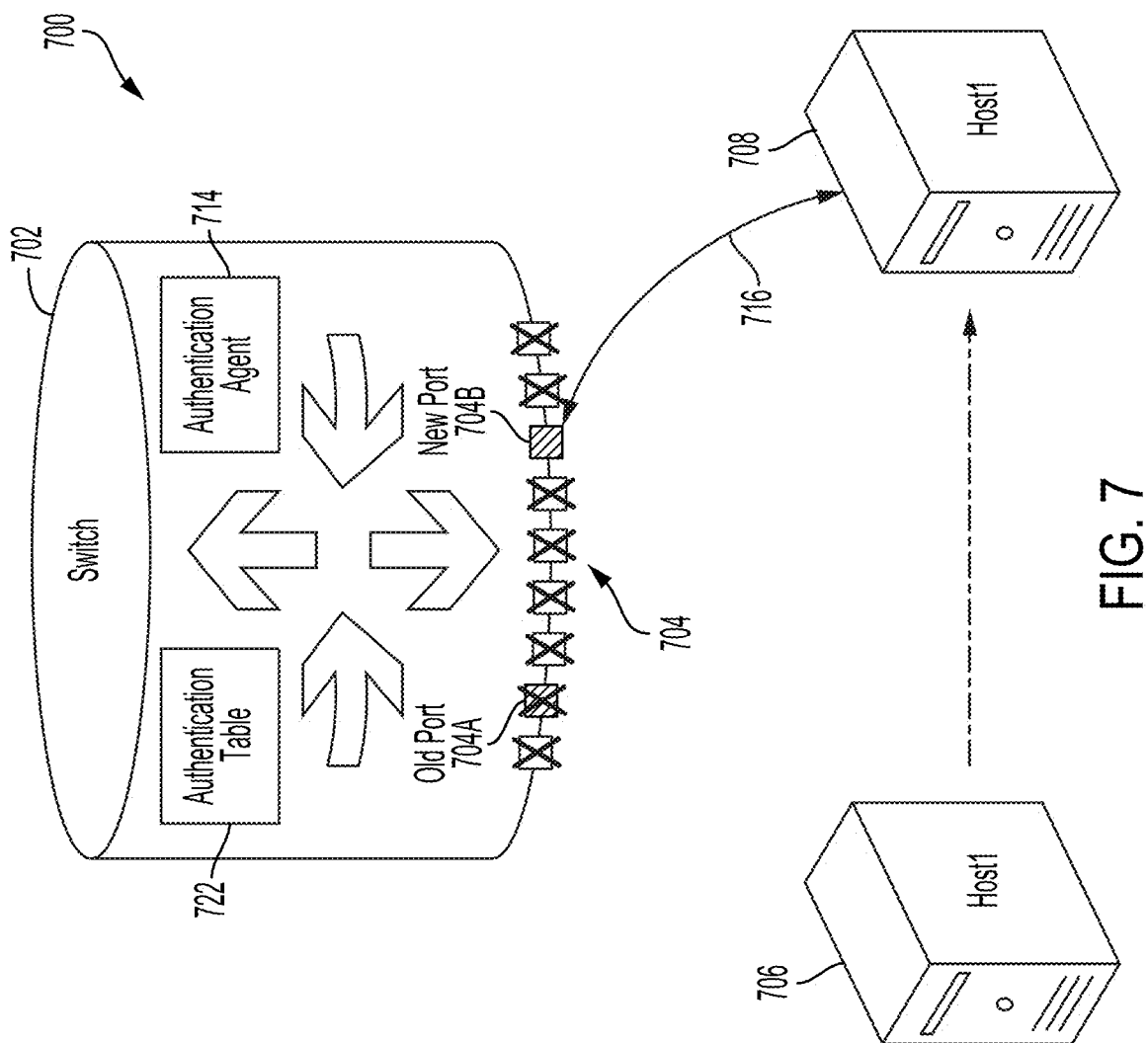
Figure 8:
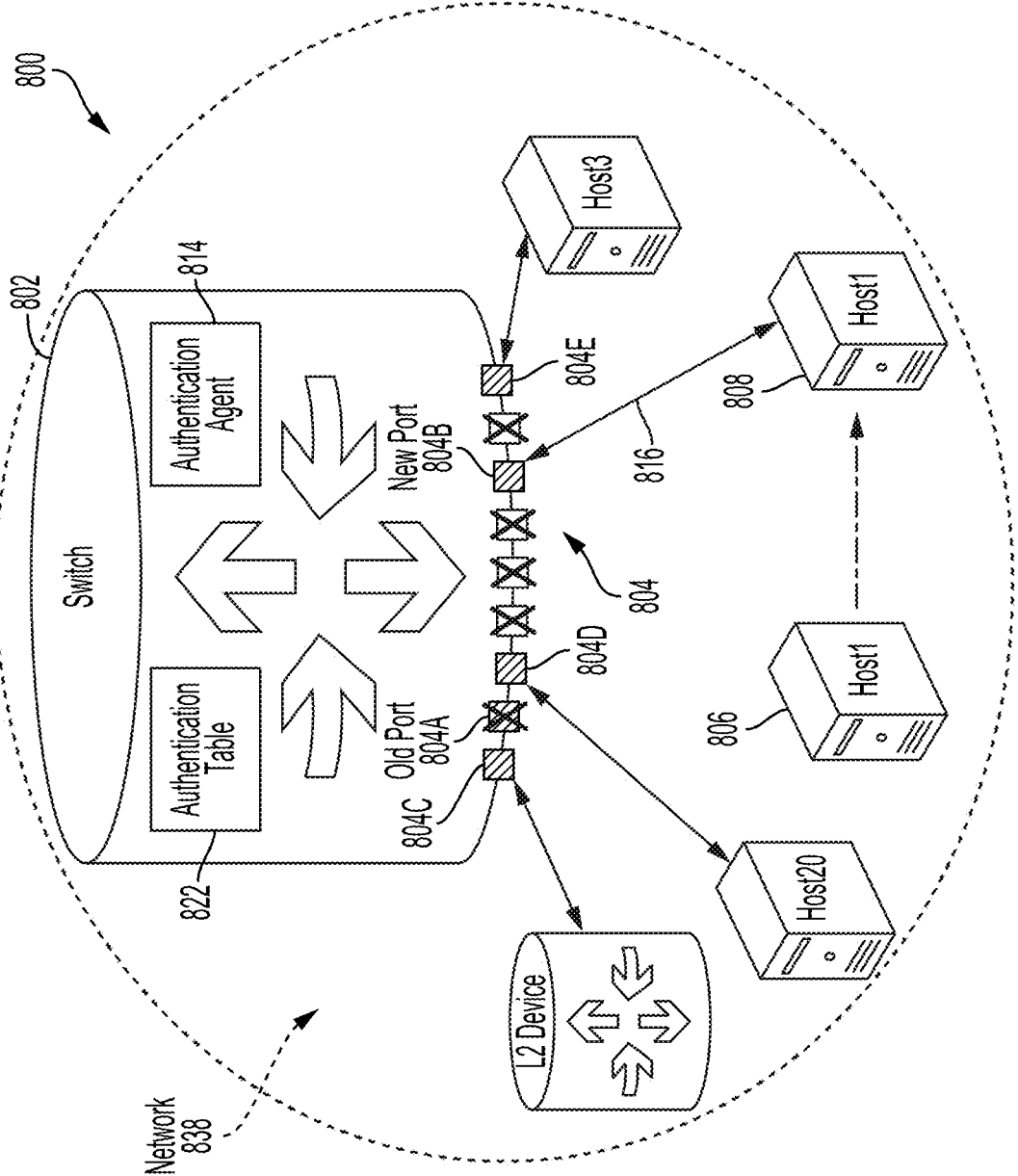

In each of FIGS. 3-8, the corresponding switch is further shown to include a forwarding table, e.g., an association of authenticated (or secure) MAC addresses and ports, used for forwarding traffic, and an authentication agent to carry out provisional authentication processes for authenticating a new switch port. For example, switch 302 of FIG. 3 is shown to include forwarding table 322 and authentication agent 314; switch 402 of FIG. 4 is shown to include forwarding table 422 and authentication agent 414; switch 502 of FIG. 5 is shown to include forwarding table 522 and authentication agent 514; switch 602 of FIG. 6 is shown to include forwarding table 622 and authentication agent 614; switch 702 of FIG. 7 is shown to include forwarding table 722 and authentication agent 714; and switch 802 of FIG. 8 is shown to include forwarding table 822 and authentication agent 814. In some embodiments, the forwarding table of FIGS. 3-8 is configured analogously to forwarding table 122 of FIG. 1, and the authentication agent in each of the FIGS. 3-8 is configured analogously to authentication agent 114 of FIG. 1.

In FIG. 3, Host1 is shown connected to port 304A of switch 302 through a link 310, analogous to link 110 of FIG. 1 except that in FIG. 3, an intermediary hub 312 is shown positioned between Host1 306, and port 304A of switch 302. Hub 312 therefore interferes with a Host1 view into in possible "link up" and "link down" events by virtue of its intermediary connection with port 304A and Host1, therefore, these events are opaque to switch 302. For example, in a scenario where Host1 unplugs, switch 302 can remain unaware of the disconnection and continue to operate under the assumption that Host1 remains connected at port 304A. A similar lack of transparency, given the intermediary position of hub 312, is likely to occur in a "sign off" scenario as earlier discussed. But various disclosed methods and embodiments implement provisional authentication and bypass the intermediary hub obstacle.

In some embodiments, hub 312 controls traffic flow from Host1 306 to port 304A of switch 30. In some embodiments using ethernet links, hub 312 connects multiple ethernet devices together to make them as a single network segment. Hub 312 may be any network hardware equipment that connects multiple network devices together to make them act as a single network segment.

The reauthentication process starts at FIG. 3 where Host1 306 is shown authenticated at port 304A of switch 302 and traffic flows from Host1 through link 310 and hub 312 to port 304A of the switch, as previously discussed. In conventional methods, despite the desire to move from port 304A to port 304B, the hardware entry at port 304B prevents Host1 from authenticating at port 304B and any attempts to forward traffic through a new port by Host1 fall short. Traffic sourced by Host1 never finds its way to port 304B because port 304B lacks proper authorization to receive the traffic. In accordance with various embodiments and techniques disclosed herein, the Host1 attempt to move to port 304B is facilitated through software reauthentication implementing a provisional authentication session compliant with one or more network security protocols, such as the 802.1x protocol.

Initially (in FIG. 3), forwarding table 322 of switch 302 includes an entry associating the Host1 MAC address with port 304A and no entry exists for an association between Host1 and port 304B.

In FIG. 4, Host1 generates and forwards authentication packets 430 intended for port 404B of switch 402 but as previously noted, the hardware entry at port 404B is not receptive of authentication packets, a task passed onto a central processor of switch 402 by hardware processes of switch 402. In some embodiments, processing circuitry 206 of FIG. 2 is configured as the central processor of switch 402 (and switches 302, 502, 602, 702, and 802). In some embodiments, processing circuitry 206 of FIG. 2 is configured as a central processor of a VTEP shown and disclosed herein, such as, without limitation, by VTEP A and VTEP B of FIG. 11, VTEP1 switches 1606, 1706, 1806, 1906, 2006, 2106, and 2206 of FIGS. 16-22, respectively, and VTEP2 switches 1604, 1704, 1804, 1904, 2004, 2104, and 2204 of FIGS. 16-22, respectively.

Authentication agent 414 is therefore afforded the opportunity to intercept and redirect authentication packets from Host1 away from port 404B and instead toward an authentication device. In essence, agent 414 establishes a provisional tunnel for implementing authentication of authentication packets 430 by an authentication device, as shown in FIG. 5. Host1 406 regular network traffic remains flowing to other network devices through port 404A given the existing authentication session at port 404A but regular network traffic—non-authentication packets—remain blocked at port 404B. In FIG. 5, authentication packets 430 from Host1 508 are participants of a new session, a provisional authentication session, under the direction of the switch authentication agent.

System 500 of FIG. 5 is further shown to include an authentication server 520, communicatively coupled to switch 302 for facilitating device authentication pursuant to an industry-adopted protocol standard. In some embodiments, server 520 is a centralized authentication server. For example, server 520 may be a remote-authentication dial-in user service (Radius) protocol-compliant server equipped to implement 802.1x authentication sessions. Server 520 may be any suitable host for carrying out authentication sessions in conformance with a network security protocol, such as without limitation, the IEEE 802.1x network protocol.

Authentication agent 514 initiates a provisional authentication session by intercepting authentication packets 530, sourced by Host1 508 and headed for port 504B of switch 502, to forward the packets instead to authentication server 520 as authentication packets 530 are received from Host1 508. Authentication agent 514 effectively implements the provisional authentication session through a provisional connection 536 to authentication server 520. In some embodiments, authentication agent 514 transmits an authentication request 532 to authentication server 520 to cause server 520 the start the new authentication session. If in response to authentication request 532, server 520 authenticates Host1 at port 504B, Host1 is considered successfully authenticated at port 504B (as shown in FIG. 6), the new port to which Host1 is desirous to migrate, and traffic is allowed to flow between Host1 508 and other network devices through a link 516 and port 504B. If the new authentication session is unsuccessful, port 504B remains blocked to traffic from Host1.

In FIG. 6, server 620 transmits an authentication acknowledgement 634 to authentication agent 614 of switch 602 and hardware processes of switch 602, generally under the control of the central processor in switch 602, cause programming the hardware port entry at port 604B to allow traffic sourced by Host1 608. In some embodiments, an entry in forwarding table 622 of the association between the Host1 MAC ("secure") address and port 604B is recorded, an indication of properly-authorized port 604B. In the meantime, Host1 continues to remain authenticated at port 604A to ensure the new port is properly authenticated before removing authentication at port 604A, a make-before-break reauthentication process. Thus, for a brief moment, Host1 is authenticated at the old port, port 604A, and at the new port, port 604B. During this brief time period, which is generally due to an inherent delay in network traffic, Host1 is theoretically allowed to communicate on both ports, but practically, Host1 has moved to the new port and cannot actually communicate on both ports.

In FIG. 7, switch 702 terminates the initial authentication session at the old port, port 704A, in favor of the new authentication session at the new port, port 704B, and Host1 traffic is blocked at port 704A whereas Host1 traffic freely flows at port 704B, and the effect is the scenario shown in FIG. 8. Provisional authentication is completed. In some embodiments, removing the association between Host1 MAC address and port 704A has the effect of terminating authentication at port 704A.

In FIG. 8, a network 838 is shown to encompass switch 802, Host1, Host20, Host3, and another Layer 2 (L2) device, in accordance with an example application embodiment. It is understood that while a total of 5 network elements are shown connected to the ports of switch 802, as many network devices as there are available switch 802 ports may be connected to switch 802. Additionally, the network devices shown connected to switch 802 are merely for illustrative purposes any other suitable network device types may be connected to the ports of switch 802. In some embodiments, the Layer 2 device may be, without limitation, another Layer 2 switch. Host1 808 is shown connected to port 804B through a link 816, which in the embodiment of FIG. 8 is configured analogous to link 116 of FIG. 1. Host3 communicates with other network devices, such as Host1, Host20, and L2 Device, through port 804E of switch 802, Host20 communicates with other devices in network 838, such as Host1, Host3, and L2 device, through port 804D of switch 802, and L2 device communicates with other devices in network 838, such as Host1, Host3, and Host20, through port 802C of switch 802. Host1 is shown to communication to other network devices through the new port, port 804B while the old port, port 804A, remains blocked to Host1. For example, Host1 may communicate to L2 device, Host20, and Host3.

Figure 9:
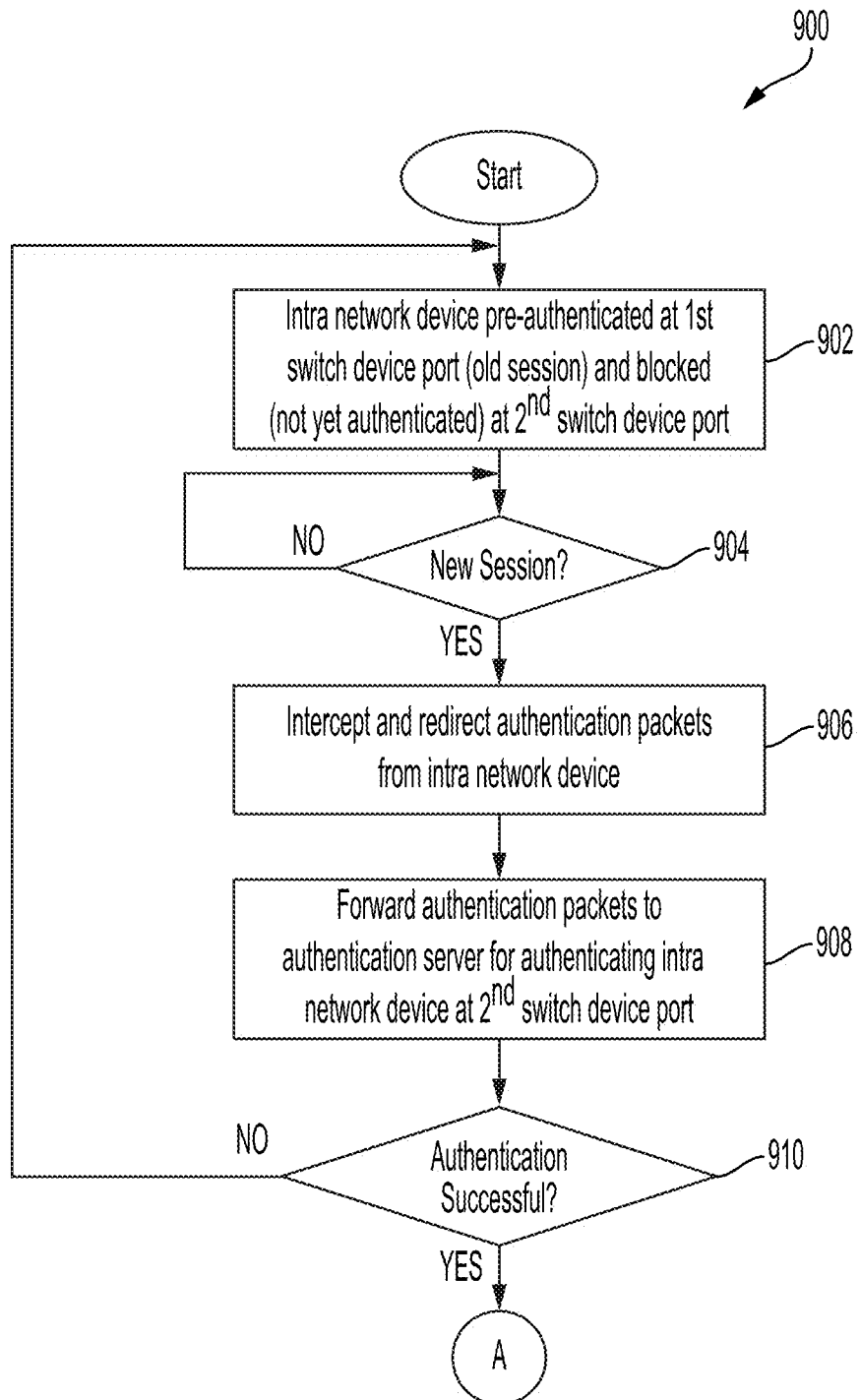
FIGS. 9-10 are flow charts of a port-to-port device reauthentication process, in accordance with some embodiments of the disclosure.

FIG. 9 depicts a flowchart of a method for authenticating a network device, in accordance with an embodiment of the invention. The process of FIG. 9 is now described with reference to the embodiment of FIG. 1. It is understood that process 900 is not limited to the embodiment of FIG. 1 and can be practiced by other network systems requiring authentication in response to a physical network device move from a switch port to a second switch port.

In FIG. 9, an authentication process 900 starts with a pre-authenticated intra network device at a first switch device port, of a switch device. For example, Host1 of FIG. 1 may be an intra network device that is pre-authenticated at port 104A, at an old or existing (authentication) session. In some embodiments, the network device may be internal to the network to which switch 102 belongs, as previously noted. At step 902, the network device is blocked from communicating at a second switch device port, the destination port, (e.g., 104B in FIG. 1) of a switch device (e.g., switch 102) common to the first and the second switch device ports. Next, at step 904, process 900 awaits a new authentication session for authenticating the network device at the new port, for example, port 104B of switch 102. In some embodiments, the new session begins when the switch authentication agent intercepts authentication packets from the network device in response to the switch hardware processes punting the packets. In some embodiments, the new authentication session may kick off in response to other events or detections.

At steps 906 and 908, the switch authentication agent (e.g., authentication agent 114) causes the switch device to redirect the intercepted packets away from the second switch device port, where they are headed, toward an authentication server to effect completion of a new authentication session. That is, during provisioning, the authentication agent causes the switch to forward the intercepted authentication packets to an authentication server (e.g. server 120) for authentication, essentially bypassing the hardware entry at the new port. The switch authentication agent transmits a request to the authentication server for authentication of the received packets.

Next, at step 910, if authentication by the authentication server is successful, process 900 continues to step 1002 (FIG. 10) and if authentication by the authentication server fails, i.e., the authentication server fails to successfully authenticate the received packets, process 900 proceeds to and resumes from step 902 give re-authentication of the switch another try. At step 912, the network device remains authenticated at the first switch device port and blocked from access at the second switch device port and process 900 ends.

Figure 10:
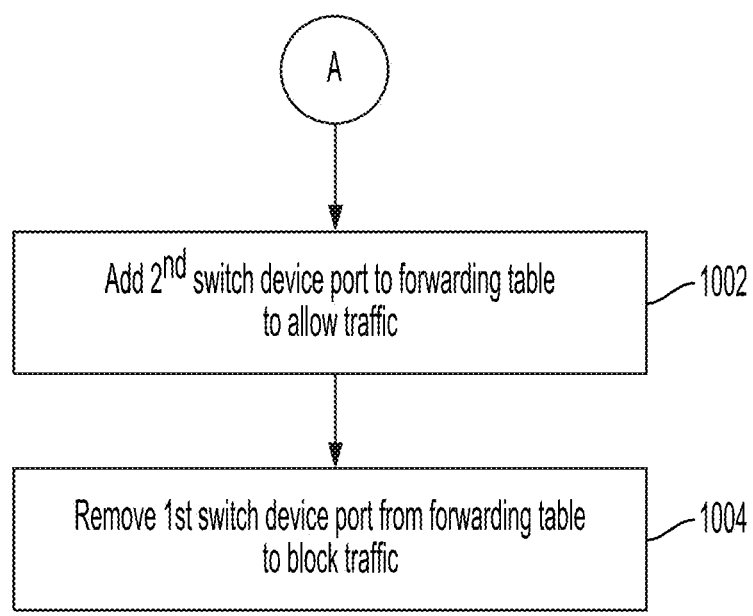

If at step 910, authentication is determined to be successful, for example, the authentication server sends an authentication acknowledgment to the switch authentication agent, process 900 proceeds to step 1002 of FIG. 10.

FIG. 10 is a flowchart of a method for continuing the authentication process 900 of FIG. 9, after step 910. At step 1002, the second switch device port is authenticated while the first switch device port remains authenticated. In some embodiments, a table entry with a correspondence between the network device MAC address (e.g., Host1 MAC address) and the second switch device port is recorded into the switch device forwarding table and at step 1004, the entry associated with the network device MAC address and the first switch device port is removed. At the completion of step 1004, the first switch device port blocks regular traffic flow from the old port, the first switch device port, and the newly authenticated second switch device port allows traffic flow and provisioning ends.

Unlike some physical network devices, there is no link up or link down to indicate when virtual machines may attach to or break away from a switch. In some embodiments, for example, a virtual or a physical machine may make a move from a first virtual switch port to a second virtual switch port of a virtual switch in a BGP-compliant network environment. In some cases, the reauthentication process is applied to a network device, configured with a virtual overlay. Movement by a virtual or physical network device, such as a virtual machine or a router, for example, between two ports of a common virtual host (local move), such as within the same VTEP, or across multiple virtual hosts (local-to-remote move), such as between two VTEPs, entails reauthentication of the moving virtual/physical network device at the destination host or host port, as the case may be, despite prior authentication of the device at the source host or host port, as previously discussed.

In a local move, the moving device, as done in the case of physical port-to-port movement above, is re-authenticated at the new (destination) port of a virtual switch while the connection between the moving device and the current (source) port of the virtual switch remains intact. At the behest of the authentication agent executing at the virtual device, a reauthentication session is initiated by the virtual switch (an example of a host) to secure reauthentication at the virtual switch destination port while the moving device remains connected and can forward all traffic flow (authentication traffic and non-authentication traffic) at the source port of the virtual switch. The moving device is blocked, however, from forwarding non-authentication traffic through the destination (or new) port but unblocked from forwarding authentication traffic through the destination port. That is, by virtue of a software authentication implementation by the virtual switch authentication agent, the switch initiates facilitating reauthentication of the moving device at the destination port. In response to successful completion of the reauthentication at the new port, the moving device establishes a connection with the new port for regular traffic flow through the new port and ultimately the switch blocks traffic flow at the source port by programming corresponding port entries accordingly. An example of a local move in the virtual space is provided subsequently below.

In a local-to-remote embodiment of the disclosure, in a general context, to facilitate reauthentication at a new virtual switch while the new virtual switch remains effectively blocked to the moving device, the current pre-authenticated virtual switch advertises a route with a payload including a new community extension (an authentication extension) signifying a local "secure" MAC mobility address to the new virtual switch. The new extended community is intended to signify that the MAC address of the moving device is secure (or authenticated) pursuant to, for example, an industry-standard protocol (e.g., 802.1x standard). In accordance with the new extended community and in opposite to a static or dynamic addressing type, the advertised route carries an authentication type to specifically signify the authorized MAC address to the destination virtual switch. In response, the new virtual switch acknowledges the advertised route to the currently authenticated virtual switch, triggering a reauthentication session.

As in physical switch port-to-port movements, during reauthentication, the new virtual switch authentication agent intercepts the authentication packets sourced by the moving device, the authentication packets are rerouted to an authentication host. In the meanwhile, and prior to the successful completion of authentication of the moving device using the authentication server, the existing authentication at the old (or current) virtual switch remains intact. While the moving device has made its physical move, the new virtual switch and the old virtual switch remain unaware of the device move. The new virtual switch posts a route to the old virtual switch including a secure (MAC mobility) authentication community extension. In response, the old virtual switch points the moving device secure (but remote) address entry to the new virtual switch and terminates the moving device existing authentication session blocking traffic from the moving device to the old virtual switch. In some embodiments, the old and new virtual switches communicate through BGP.

Various features of some disclosed embodiments and methods are premised on the above described virtual authentication processes. Additionally, in a virtual application, EVPN is extended to carry the notion of a "secured" MAC address between the source and destination virtual devices. Traditionally, the "secured" MAC address is an intermediary level of "stickyness" between that of a pure dynamic address and that of a pure static address. In a disclosed method and embodiment however, a "secured" MAC address indication of an authentication extension, carried by an advertised route by an EVPN source virtual device to an EVPN destination virtual device signifies a corresponding authenticated (e.g., 802.1x-compliant) MAC address. In some embodiments, routes announced with the authentication extension are afforded a higher priority over routes announced without the authentication extension regardless of the MAC mobility sequence number.

An authentication extension, as used in reference to and shown in FIGS. 11-25, refers to an extension or an "extended community extension" or "extended community" as used herein. An example of an authentication extension is shown in an advertised route in FIG. 18 and an example authentication extension is shown in FIG. 25. In some embodiments, authentication extensions may refer to authentication in compliance with any industry-adopted network authentication protocols, such as, without limitation, the IEEE 802.1x protocol.

Figure 11:
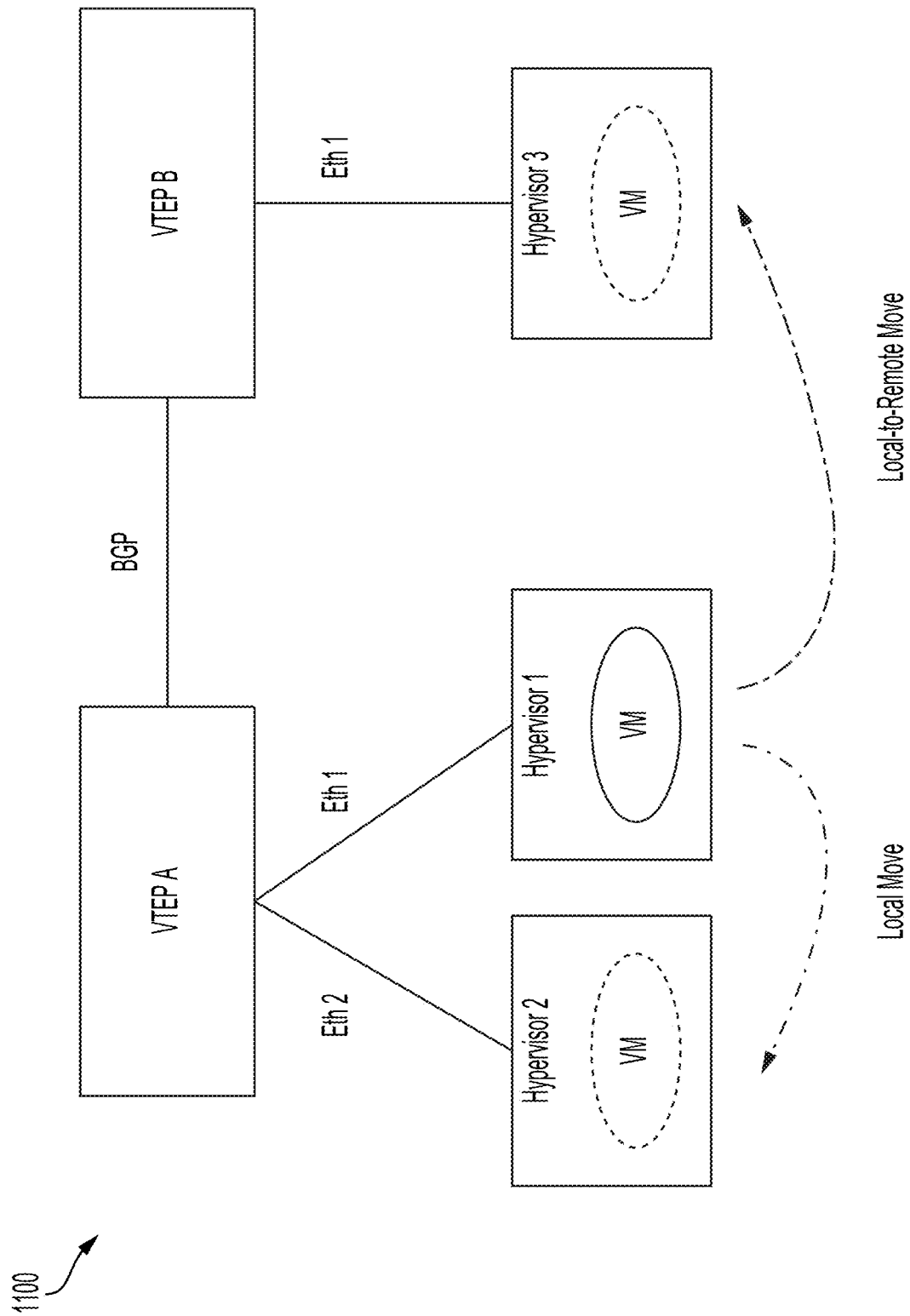
FIG. 11 is an illustrative block diagram of an example virtual network system, in accordance with some embodiments of the disclosure.

Further details of the above virtual device reauthentication processes are now discussed with reference to the embodiments of FIGS. 11-25. FIG. 11 is an illustrative example of a networking system 1100, in accordance with various embodiments and methods of the disclosure. In FIG. 11, system 1100 is shown to include a first network including VTEP A communicatively coupled to VTEP B of a (different) second network. For example, VTEP A and VTEP B may be in an EVPN environment, communicating through BGP, a practical example of which is shown relative to the VTEP1 switch and the VTEP2 switch of FIGS. 16-22.

In FIG. 11, VTEP A is shown coupled to a host, Hypervisor 1, in the first network, via a physical Ethernet link, Eth1. Analogously, VTEP B is shown coupled to a host, Hypervisor 3, of the second network, via a physical Ethernet link, Eth1. Hypervisor 1 is shown to include a host machine, for example, a virtual machine (VM). The network components of FIG. 11 may be configured as Layer 2 components, it is understood however that in various embodiments, these components may be configured in accordance with other layers of the network model.

Additionally, VTEP A and VTEP B may each be coupled to respective virtual machines through link types other than Ethernet links. While not shown, it is understood that each of VTEP A and VTEP B maintains a respective forwarding table of associations between host secure MAC addresses and corresponding ports (for port-to-port movement) and secure MAC addresses and corresponding hosts (for host-to-host movements). For example, VTEP A maintains a table (e.g., forwarding table) of cross-referenced authenticated MAC addresses to port (or host) entries including an initial (pre-move) entry for the VM MAC address and a VTEP A port (through the Eth1 link to Hypervisor 1) because VM is initially authenticated at VTEP A port but the table does not initially include an entry for a correspondence between the VM MAC address and a port that where VM is not authenticated. Similarly, the forwarding table of VTEP B initially does not have an entry corresponding to the VM MAC address.

The embodiments of subsequent figures of the disclosure are presumed to include Layer 2 devices and authentication is presumed pursuant to the 802.x1 protocol standard although, as previously indicated, devices of alternate embodiments may operate in layers other than Layer 2 and authentication may be performed pursuant to other suitable network authentication standards. By virtue of the inherent behavior of Hypervisors 1, 2, and 3, there is no link down event in response to a VM move, consequently, VM is not provided with the opportunity to link down or "sign off" when moving from a virtual device to another device, be it a local move or a local-to-remote move. A timeout disengagement, as previously described, is too lengthy and inefficient.

In some embodiments, a physical device, such as without limitation, a notebook or a laptop, instead of VM may be moving from a port on VTEP A to another port on VTEP A or from VTEP A to VTEP B. For simplicity of illustration, an example virtual machine is presumed to make a move in the embodiments of FIGS. 11-22.

With continued reference to FIG. 11, pursuant to a local move, VM wishes to leave its currently authenticated connection with VTEP A port, which is coupled to the VM through link Eth1, and establish a new connection through link Eth2 to another VTEP A port, connecting through link Eth2 when the link is established. But VM cannot reliably establish the new connection without successful authentication at the new port for proper connection through link Eth2 to the new VTEP port. The new port has no knowledge of the VM in the absence of a corresponding MAC address entry. The steps for effecting the VM local VTEP A move in FIG. 11 are now described in relation to a process 1300 of the flow chart shown in FIG. 13.

Figure 13:
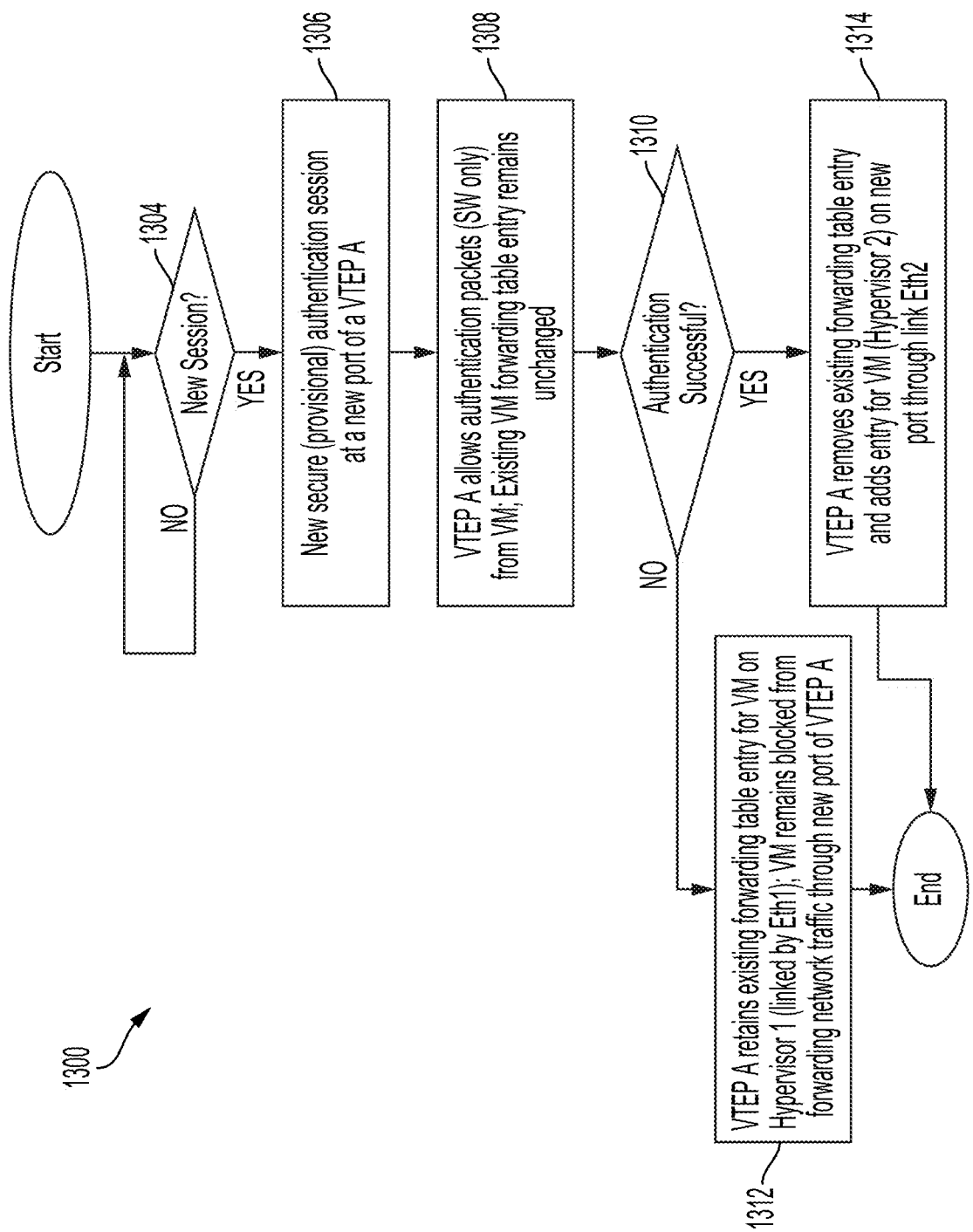
FIG. 13 is a flow chart of a local device move reauthentication process, in accordance with some embodiments of the disclosure.

FIG. 13 is a flow chart of a local device move reauthentication process, in accordance with some embodiments of the disclosure. In FIG. 13, at step 1304, process 1300 awaits a new authentication session. A new authentication session may be triggered by authentication packets forwarded from the new port of VTEP A in accordance with step 1306 of FIG. 13. As previously discussed, hardware processes controlling hardware port entries at VTEP A are expected to punt authentication packets to a central processor. Accordingly, the hardware port entries at the new port will not entertain opening the port to regular (non-authentication) network traffic. Instead, at step 1308, a VTEP A authentication agent takes over and intercepts authentication packets from VM, requests authentication from an independent authentication host, and causes redirection of the authentication packets from VM to the dedicated authentication host. The process is then left up to the authentication host and the moving device to authenticate the latter at the new port of VTEP A. The authentication agent has affectively initiated a software-only authentication at the new port and bypassed conventional hardware-based packet processing. The VM MAC address entry of a VTEP A forwarding table remains the same, i.e., associated with the existing authenticated port, linked to VM through the link Eth1. Upon the completion of authentication of VM at the new port, the authentication agent may receive an acknowledgement from the independent authentication host and program the hardware entries to the new port on VTEP A allowing regular network traffic to be forwarded to the new VTEP A port. The authentication agent may alternatively or additionally direct hardware processes of VTEP A to program the new port hardware entries.

At step 1310, successful reauthentication (or authentication at the new port) must occur before process 1300 proceeds to step 1314 and in the event reauthentication is unsuccessful, process 1300 proceeds to step 1312. At this juncture, VM authentication is implemented by VM authenticating itself at the VTEP A, new port, using the authentication server.

At step 1312, VTEP A retains the forwarding table MAC address entry for VM at the existing authenticated port of Hypervisor 1, (linked through Eth1) and remains blocked from connecting to the new port of Hypervisor 1, and process 1300 ends. VM effectively is denied its desired move. At step 1314, VTEP A removes the existing VM MAC address forwarding table entry and adds an entry to the table for the VM MAC address at the new VTEP A port, the new port connects VM to Hypervisor 2 through link Eth2. VM has successfully made its desired move and Process 1300.

Pursuant to a local-to-remote VM move, with continued reference to FIG. 11, VM wishes to leave its currently authenticated connection to VTEP A, through link Eth1 to Hypervisor 1, and establish a new connection at VTEP B, through a link Eth1 to Hypervisor 3. But VM cannot reliably establish a connection at VTEP B without first undergoing successful authentication at VTEP B. The steps for effecting the VM local-to-remote VTEP move relative to FIG. 11 are now described relative to process 1400 of the flow chart shown in FIG. 14.

Figure 14:
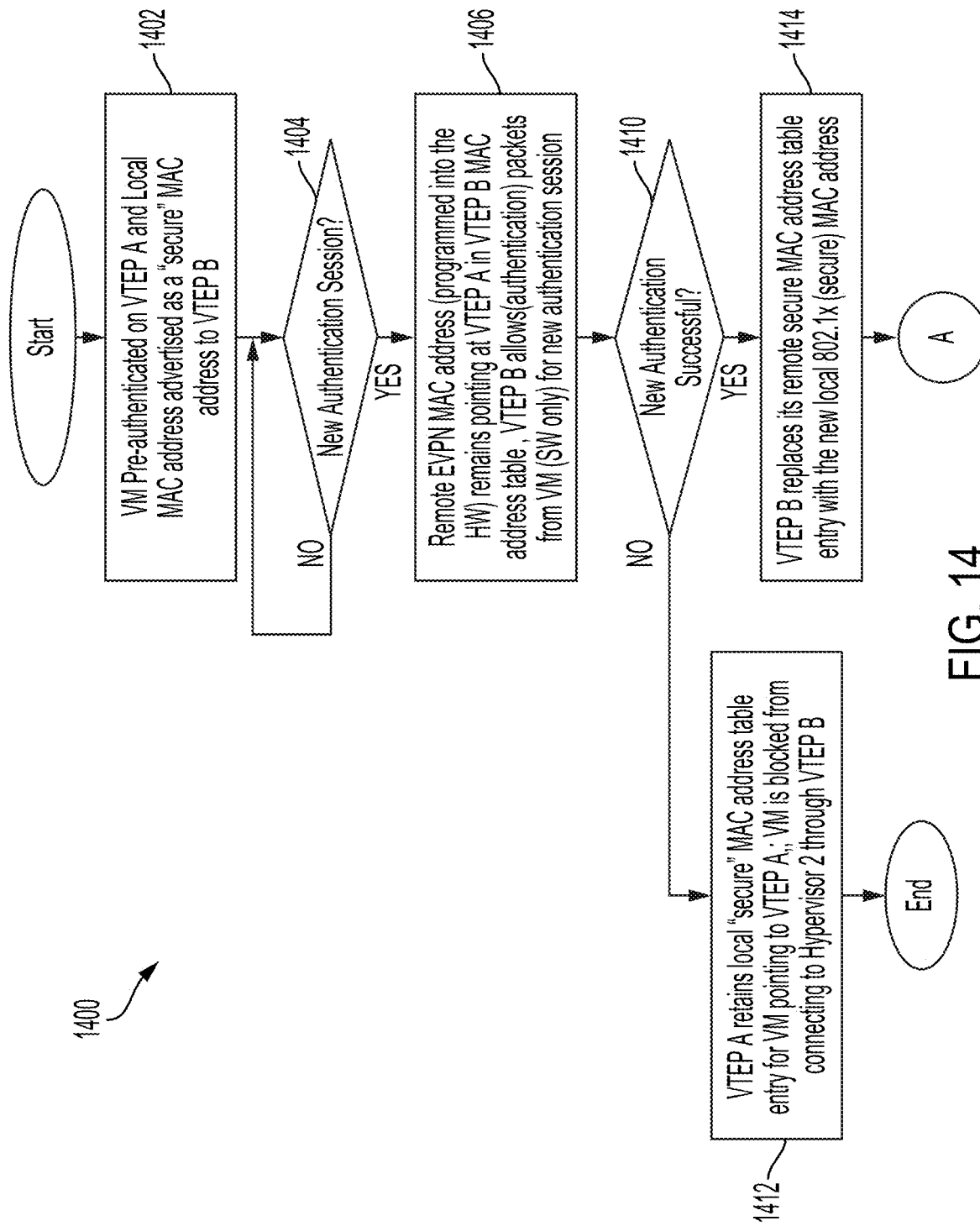
FIGS. 14-15 are flow charts of a local-to-remote device move reauthentication process, in accordance with some embodiments of the disclosure.
Figure 15:
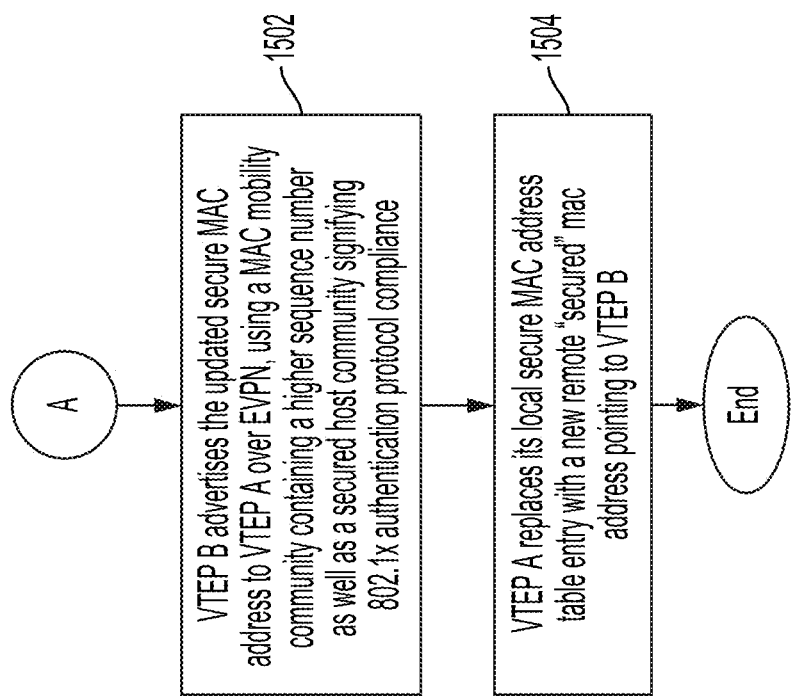

FIGS. 14-15 are flow charts of a local-to-remote device move reauthentication process, in accordance with some embodiments of the disclosure. At step 1402, VM is pre-authenticated at VTEP A and a local MAC address at VTEP A is advertised as a secure MAC address by VTEP A to VTEP B. At step 1404, process 1400 awaits a new authentication session and when one starts, process 1400 proceeds to step 1406. the authentication session may be triggered in various ways. For example, hardware processes at VTEP B may punt authentication packets received from VM to a central processor at VTEP B and the central processor at VTEP B may call an authentication agent of VTEP B to facilitate the provisional authentication session.

At step 1406, the remote EVPN MAC address remains pointing to VTEP A in the forwarding table at VTEP B and the authentication agent at VTEP B allows packets from VM during the new authentication session. The remote EVPN MAC address pointing to VTEP A in the forwarding table at VTEP B may be hardware-programmed and in the forwarding table of VTEP B and updated with a local EVPN MAC address pointing to VTEP B when re-authentication of VM is completed. Next, at step 1410, no change to the MAC addresses in respective forwarding tables of VTEP A and VTEP B is made while awaiting the new authentication session is in progress. If the new authentication is successful, process 1400 proceeds to step 1414 and if the new authentication is unsuccessful, process 1400 proceeds to step 1412. At step 1412, because VM is not re-authenticated, VTEP A retains its local secure MAC address table entry for VM pointing to the existing authenticated port at VTEP A and VM remains blocked from establishing a connection at Hypervisor 3, at VTEP B.

At step 1414, VTEP B replaces its remote MAC address table entry with a new local 802.1x-authenticated MAC address based on the new authentication session, therefore, taking over the new secure MAC address and process 1400 proceeds to step 1502 of FIG. 15. At step 1502 *f* FIG. 15, VTEP B may advertise the new secure MAC address to VTEP A over EVPN 1102 using MAC mobility community (also referred to herein as "MAC mobility extension") with the advertised route including a sequence number equal to a prior sequence number associated with the advertised route incremented by one, and a secured host (new extended) community signifying the 802.1x authentication protocol compliance. As discussed further below, in some embodiments, indication of 802.1x authentication may be implemented in a "type" field of the advertised route header.

Figure 23:
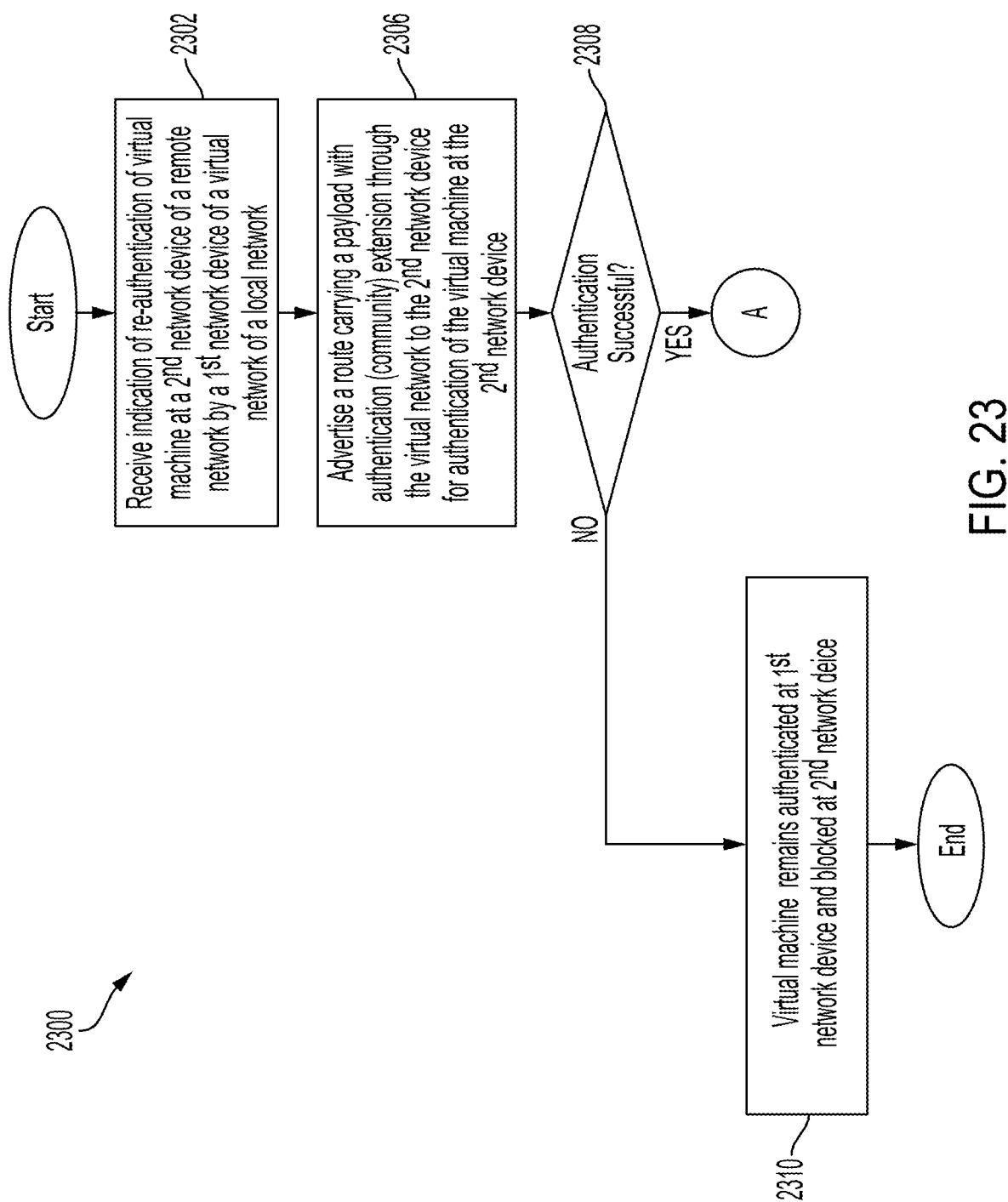
FIGS. 23-24 are flow charts of a virtual machine move reauthentication process, in accordance with some embodiments of the disclosure.
Figure 24:
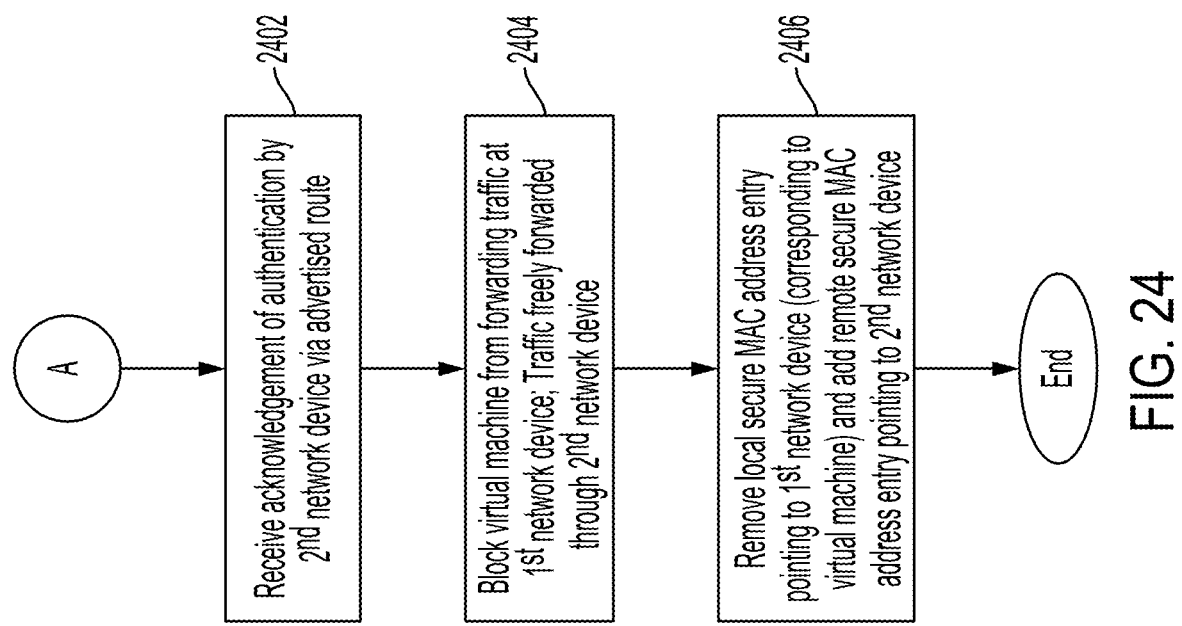
Figure 25:
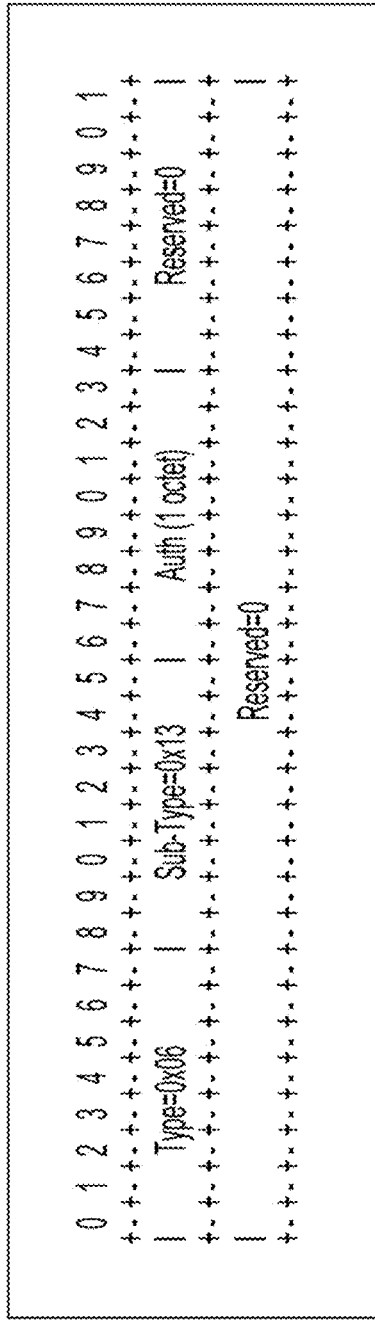
FIG. 25 shows an example structure of an authentication extension, in accordance with some embodiments of the disclosure.

In some embodiments, processes 1300 and 1400 of FIGS. 13-14, respectively, and the first and second network devices of FIGS. 23-24 may be executed by respective processing circuitry of the VTEP processors. For example, processing circuitry 206 of FIG. 2 in each of VTEP A and VTEP B, may execute processes 1300 and 1400, as appropriate, and first and second network devices in process 2300 may be executed by processing circuitry 206 of FIG. 2. Moreover, authentication agents of VTEP A and VTEP B and the first and second network devices of FIGS. 23-24 may be implemented by processing circuitry 206 executing respective authentication agent program codes, stored in a respective storage 208 of VTEP A and VTEP B.

Next, at step 1504, in response to the EVPN advertised route of step 1502, VTEP A replaces its local secure MAC address table entry with the new remote secure MAC address from VTEP B pointing to VTEP B consistent with VM's move to VTEP B and process 1400 ends.

In some embodiments, routes, for example, at step 1502 of FIG. 15, may be encapsulated in accordance with a network tunneling protocol by an advertising network device. Examples of tunnel encapsulations that may be implemented in accordance with some embodiments of the disclosure include, without limitation, VXLAN, MPLS, Generic Routing Encapsulation (GRE), and Control and Provisioning of Wireless Access Points (CAPWAP).

As earlier noted, in some embodiments, in a virtual networking environment, such as BGP, a virtual machine may break an established connection to a host source port to establish a new connection at a host destination port of a host common to both ports—an inter-network or local move—without the prerequisite to "sign off" or disconnect. In some embodiments, a virtual machine may break an established connection to a source host of a network to establish a new connection at a destination host of a different network—an intra network or local-to-remote move—without a prerequisite to "sign off" or disconnect. In a local move embodiment, a local secure MAC table (referred to commonly herein as a "local forwarding table" or "forwarding table" or "host table") maintains an association of authenticated virtual machines to local ports.

In a local-to-remote move embodiment, each host maintains a local secure MAC table of associations between authenticated virtual machines and local ports.

In some embodiments, an entry of a local secure MAC address table of, for example, a VTEP, specifies the MAC address of a corresponding VM and all the allowed (authenticated) local interface identifiers (e.g. Eth1). If the authenticated VM can be moved remotely, the secure MAC address table entry also specifies either a wildcard IP address, for example 255.255.255.255, or all the allowed remote VTEP IP addresses. In the embodiment of FIG. 11, (authenticated) VM may move to a (1) different local port as well as a (2) remote VTEP port without the requirement to "sign off" or disconnect itself from a server, for example and without limitation, from a Radius server. The MAC address table ("MAT") of each VTEP includes the layer 2 forwarding state on a corresponding VTEP switch. By way of example, the state of MAC address table entries for a VM move is presented in the tables of FIGS. 12A-12F. As discussed below, first, the VM makes a local move followed by a subsequent local-to-remote move within the virtual network environment of FIG. 11.

In the tables of FIGS. 12A-12F, "M1" is presumed to be the MAC address of the moving device, i.e. VM; the Eth1 link to Hypervisor 1 is presumed to start at port "P1" of VTEP A, moves to port "P2" of VTEP A, and from "P2" of VTEP A to port "P10" of VTEP B. Given the foregoing presumption, VTEP A and VTEP B update their respective MAC address tables as the moving device moves from one port to another and from one virtual switch to another as follows. The row of each table of FIGS. 12A-12F represents the state of M1 for VTEP A and for VTEP B, as shown under a respective column. Under each VTEP column, a port number and a type are shown, where applicable. "Type" represents the authentication type, for example, 802.1x. Initially, M1 is unknown to both VTEP A and VTEP B, as indicated by "Not Present" in the table of FIG. 12A. Next, VM connects to and successfully authenticates itself on port P1 of VTEP A. Accordingly, the state of M1, as shown in the table of FIG. 12B, is port P1 and type 802.1x at VTEP A and none (Not Present) at VTEP B because VM is not present or lacks an established connection at VTEP B.

Next, VTEP A advertises M1 to VTEP B with an EVPN type 2 route using the new extended (or authentication) community to signify the existing authentication of VM to VTEP B. Therefore, M1, in the table of FIG. 12C, at VTEP A, remains the same, i.e. at P1, Type 802.1x, but M1 at VTEP B becomes VTEP A for the port number and "EVPN remote authenticated" for the authentication type. "EVPN remote authenticated" represents M1 as a remotely authenticated MAC address to VTEP A and is a part of the new extended community carried by the advertised route.

Next, VM makes a local move from port P1 to port P2 of VTEP A but has yet to authenticate at P2 of VTEP A. The MAT of both VTEPs remain unchanged while the authentication of VM at P2 is in progress, therefore, no table corresponding to the unchanged M1 is shown. Assuming authentication of VM at P2 completes successfully, the MAT on VTEP A is updated to reflect the newly authenticated port and no change is made to the state of M1 on VTEP B. Accordingly, the table of FIG. 12D shows the port under VTEP B as P2 and the type as 802.1x and the state of M1 at VTEP B identical to that of FIG. 12C.

Next, VM makes a local-to-remove move from port P2 of VTEP A to port P10 of VTEP B. VTEP B starts a new authentication session and no change is made to the MAT of either VTEP while the new authentication is in progress. Assuming the new authentication at P10 is successful, the VTEP B MAT is updated with P10 and the VTEP A MAT remains unchanged relative to the state shown at the table of FIG. 12D, as shown in the table of FIG. 12E. Notably, because an EVPN route has yet to be advertised by VTEP B to VTEP A, two ports experience overlapping authentication sessions and VTEP A and VTEP B are temporarily out of-sync. Next, VTEP B advertises to VTEP A the VM move to P10 with another type 2 EVPN route using a MAC mobility header and the authenticated (extended) community and VTEP A updates its MAT to match the advertised move. Therefore, as shown in the table of FIG. 12F, the state of M1, under the VTEP A column, is shown as VTEP B and the type is shown as EVPN remote authenticated. The state of M1 under the VTEP B column remains the same as that of the state of M1 in the tables of FIGS. 12D and 12E.

Figure 16:
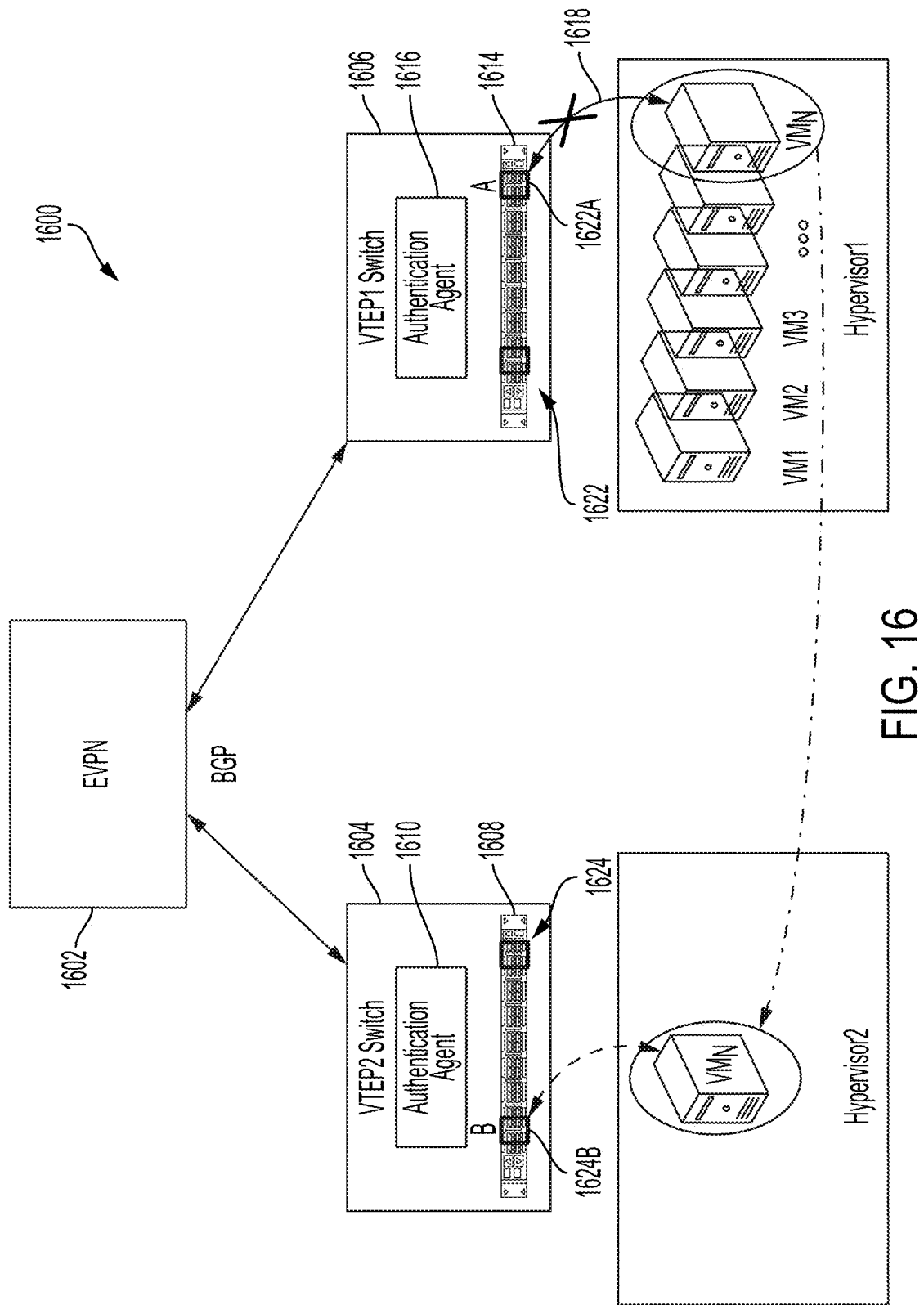
FIGS. 16-22 are illustrative block diagrams of an example network system, in accordance with some embodiments of the disclosure.

FIGS. 16-21 are illustrative block diagrams of example network systems, in accordance with some embodiments of the disclosure. FIG. 16 illustrates a block diagram of a network system 1600, in accordance with an embodiment of the disclosure. System 1600 is shown to include an EVPN 1602, a VTEP1 switch 1606, a VTEP 2 switch 1604, a Hypervisor1, and a Hypervisor2. VTEP 1 switch 1606 is shown to include an authentication agent 1606 and a VTEP 1614, and VTEP2 switch 1604 is shown to include an authentication agent 160 and a VTEP 1608. VTEP 1614 is shown to include ports 1622 and VTEP 1608 is shown to include ports 1624. Subject to proper authentication, a VM of Hypervisor1 may physically connect to a port of ports 1622 of VTEP 1614 through a link and a VM of Hypervisor2 may physically connect to a port of ports 1624 of VTEP 1608. For example, $VM_N$ of Hypervisor1 may connect to port 1622A through a link 1618 and a VM of Hypervisor2 may connect to port 1624B through a link 1612. It is understood that a VM of Hypervisor1 may connect with any port of ports 1622 of VTEP 1614 subject to proper authentication, and a VM of Hypervisor1 may connect with any port of ports 1624 of VTEP 1608 subject to proper authentication.

Hypervisor1 is shown to include an N number of VMs, "N" representing an integer value. While Hypervisor1 is shown void of any VMs, in some embodiments, Hypervisor1 may indeed include VMs. It is understood that any one of the structures shown in FIG. 16 may include components not shown in FIG. 16. It is additionally understood that system 1600 is a conceptual block diagram of an example virtual system illustrated merely for the purpose of discussion and that embodiments may deviate by the number of components, links and connections, in addition to having a fewer or a greater number of components. It is understood that the components of system 1600 may be replaced with components suitably configured to execute the reauthentication processes of various embodiments disclosed herein.

In some embodiments, each of the VTEP switches of FIGS. 16-22 may be configured as the VTEPs of FIG. 11. Similarly, each of the hypervisors of FIGS. 16-22 may be configured as the hypervisors of FIG. 11 and links 1612 and 1618 may be configured as the ethernet links (Eth1 and Eth2) of FIG. 11. In some embodiments, while not shown in FIGS. 16-22, a hub may be connected between each hypervisor and a respective VTEP similar to the physical switch port or physical switch-to-physical switch embodiments of FIGS. 1-8. For example, a hub analogous to hub 412 of FIG. 4, but configured to be operational with virtual switches, may be connected between Hypervisor2 and VTEP2 and another may be connected between Hypervisor1 and VTEP1.

System 1600 of FIG. 16 illustrates a schematic of a VM move from one VTEP to another after the move operation is completed in accordance with the reauthentication embodiments and methods disclosed herein. Systems 1700-2100 of FIGS. 17-22, respectively, present the configuration outcome of the same network system after a reauthentication step is completed, as discussed below. Accordingly, common components across FIGS. 16-21 are referenced using like reference numbers. For example, EVPN 1602 in FIG. 16 is referenced as an EVPN 1702 in FIG. 17, an EVPN 1802 in FIG. 18, an EVPN 1902 in FIG. 19, an EVPN 2002 in FIG. 20, an EVPN 2102 in FIG. 21, and an EVPN 2202 in FIG. 22. Similarly, VTEP1 switch 1606 in FIG. 16 is referenced as a VTEP1 switch 1706 in FIG. 17, a VTEP switch 1806 in FIG. 18, a VTEP1 switch 1906 in FIG. 19, a VTEP switch 2006 in FIG. 20, a VTEP1 switch 2106 in FIG. 21, and a VTEP switch 2206 in FIG. 22, and so on. Additionally, components and connections, as discussed herein relative to the embodiment of FIG. 16 are application to each of the embodiments of FIGS. 17-22. Also, while the discussions of FIGS. 16-22 are centered around a virtual machine, $VM_N$, (or host-to-host), it is understood that any of the remaining VMs of hypervisor 1 may make a similar move to hypervisor 2 in accordance with some disclosed methods and embodiments. Additionally, $VM_N$ may instead be a physical device moving from VTEP1 switch 1606 to VTEP1 switch 1604.

In each of the FIGS. 16-22, $VM_N$, the Nth VM in Hypervisor1, is presumed to move from an existing connection at port 1622A of VTEP 1622 through a link 1618 of Hypervisor1 where $VM_N$ is pre-authenticated to port 1624B of VTEP 1624 of Hypervisor2, a remote host relative to Hypervisor 1, where $VM_N$ is not initially authenticated. In some embodiments, system 1600 and each of systems 1700-2200 are BGP networks. In the example embodiment of FIGS. 16-22, an EVPN is presumed. In some embodiments, the links physically connecting a VM to a VTEP port are Ethernet Layer 2 links. For example, existing link 1618 and an unestablished link 1612 may be Ethernet links.

Each of VTEP1 switch 1606 and VTEP2 switch 1604 includes a forwarding table (not shown), also referred to herein as a "host table", for forwarding traffic at authenticated local and remote nodes. For example, and as discussed relative to preceding figures, each VTEP forwarding table holds associations between secure MAC addresses and port numbers. In some embodiments, each forwarding table holds information in addition to MAC addresses and corresponding port numbers, to reliably effect the process of a virtual machine reauthentication movement to a destination host by establishing a handshake procedure between the source and destination hosts. In accordance with example embodiments, the handshake information includes a new extended community (or authentication extension) as previously discussed. For example, the new extended community may include authentication information related to a particular authentication protocol standard to advertise the pre-moving virtual machine is pre-authenticated at a source host. In an embodiment, other than MAC addresses and port numbers, a forwarding table entry may include the corresponding authentication type.

In each of the embodiments of FIGS. 16-22, $VM_N$ is presumed pre-authenticated at VTEP1. In an embodiment, $VM_N$ is assumed authorized t port of VTEP1 switch 1606, specifically, port 1622A of ports 1622 of VTEP 1614 and linked to Hypervisor1 through link 1618. For example, authentication agent 1616 of system 1600 may have facilitated a $VM_N$ pre-authentication process. $VM_N$ wishes now to move to VTEP2 and link with Hypervisor2 but is prevented from forwarding traffic at a port of VTEP2 switch 1604 without packet loss risks unless $VM_N$ is re-authenticated at a port of VTEP2 switch 1604 because VTEP2 switch 1604, by its very nature, remains ignorant of a VM link down and/or sign off event, as earlier discussed. Upon the completion of successful reauthentication, pursuant to an embodiment and method of the disclosure, as discussed in further detail with reference to FIGS. 17-22, $VM_N$ may move to VTEP2 switch 1604 and freely forward traffic, for example, through link 1612, at port 1624B of VTEP 1608.

FIGS. 17-22 each illustrate a block diagram of a network system, in accordance with select illustrative embodiments of the disclosure. More specifically, FIGS. 17-22 depict block diagrams of network systems 1700-2200, respectively. As previously noted, an example procedure for a VM move, in a virtual (EVPN) environment, from VTEP1 switch 1606 to VTEP2 switch 1604 is shown in a series of steps using FIGS. 17-22.

Figure 17:
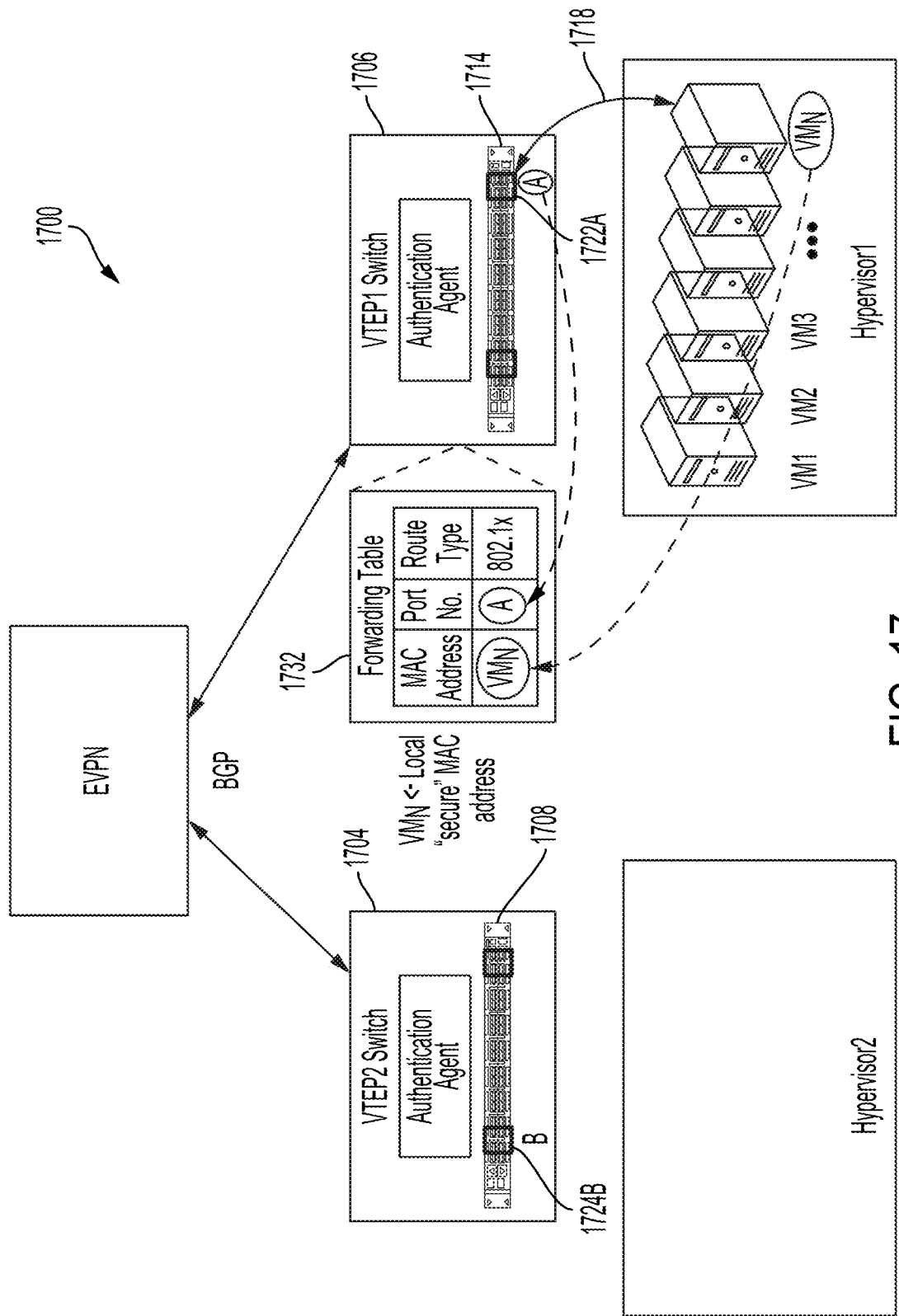

At FIG. 17, $VM_N$ is shown authenticated, with a reliable established connection, to port 1722A of VTEP 1714 of VTEP1 switch 1706. Port 1722A is identified by port value "A". $VM_N$ wishes to move to port 1724B of VTEP 1708 of VTEP2 switch 1704. Port 1724B is identified by port number "B". VTEP1 switch 1706 is shown to house a forwarding table 1732 with entries cross-referenced by authenticated (or "secure") MAC addresses and corresponding port numbers. In some embodiments, a forwarding table of various embodiments of the disclosure, such as without limitation, forwarding table 1732, may include an aggregation of one or more authentication tables with MAC addresses and corresponding authenticated ports. In some embodiments, one or more of the authentication tables may be implemented in software and incorporated into a corresponding forwarding table by hardware, software, or a combination implementation.

Figure 21:
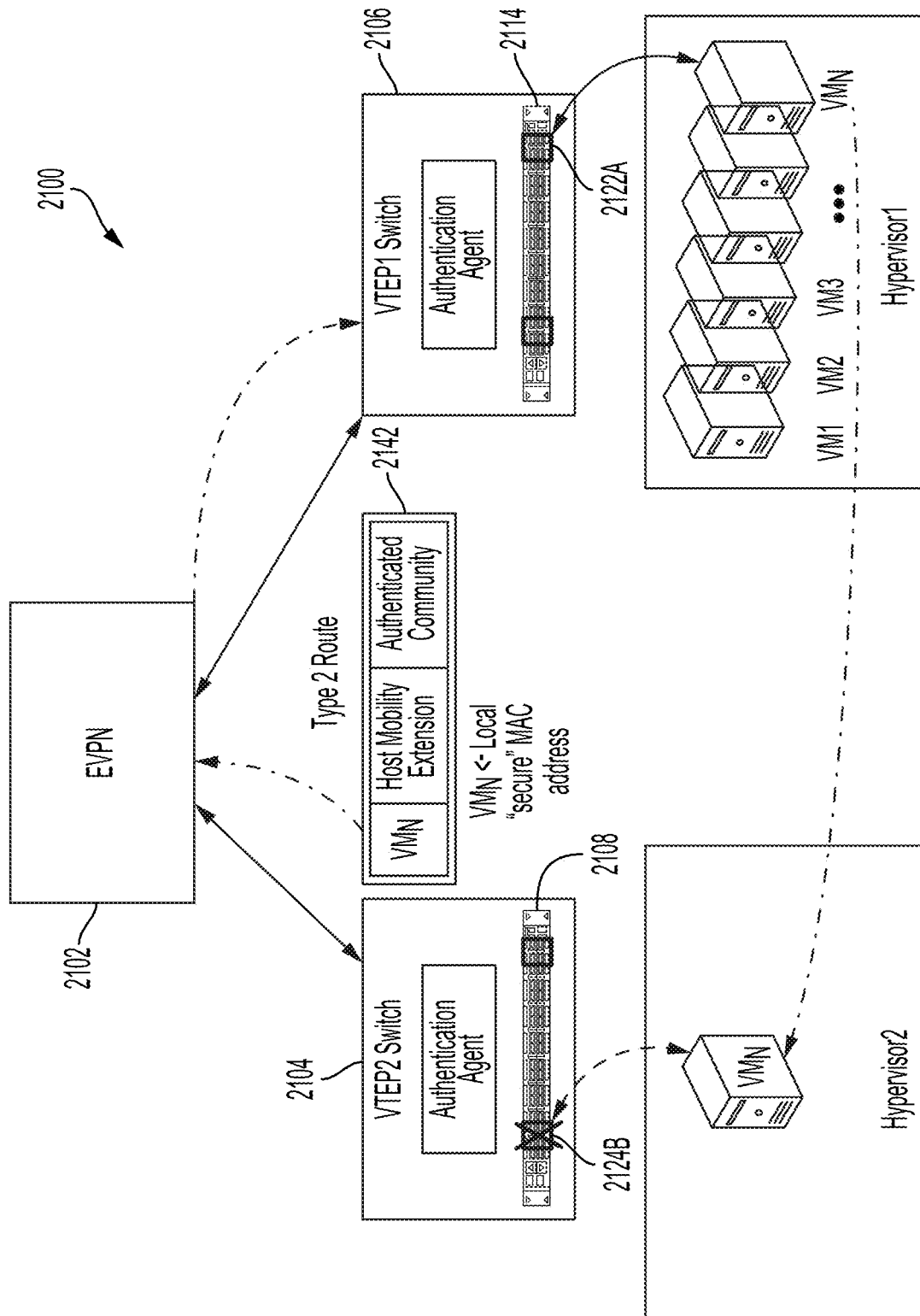
Figure 22:
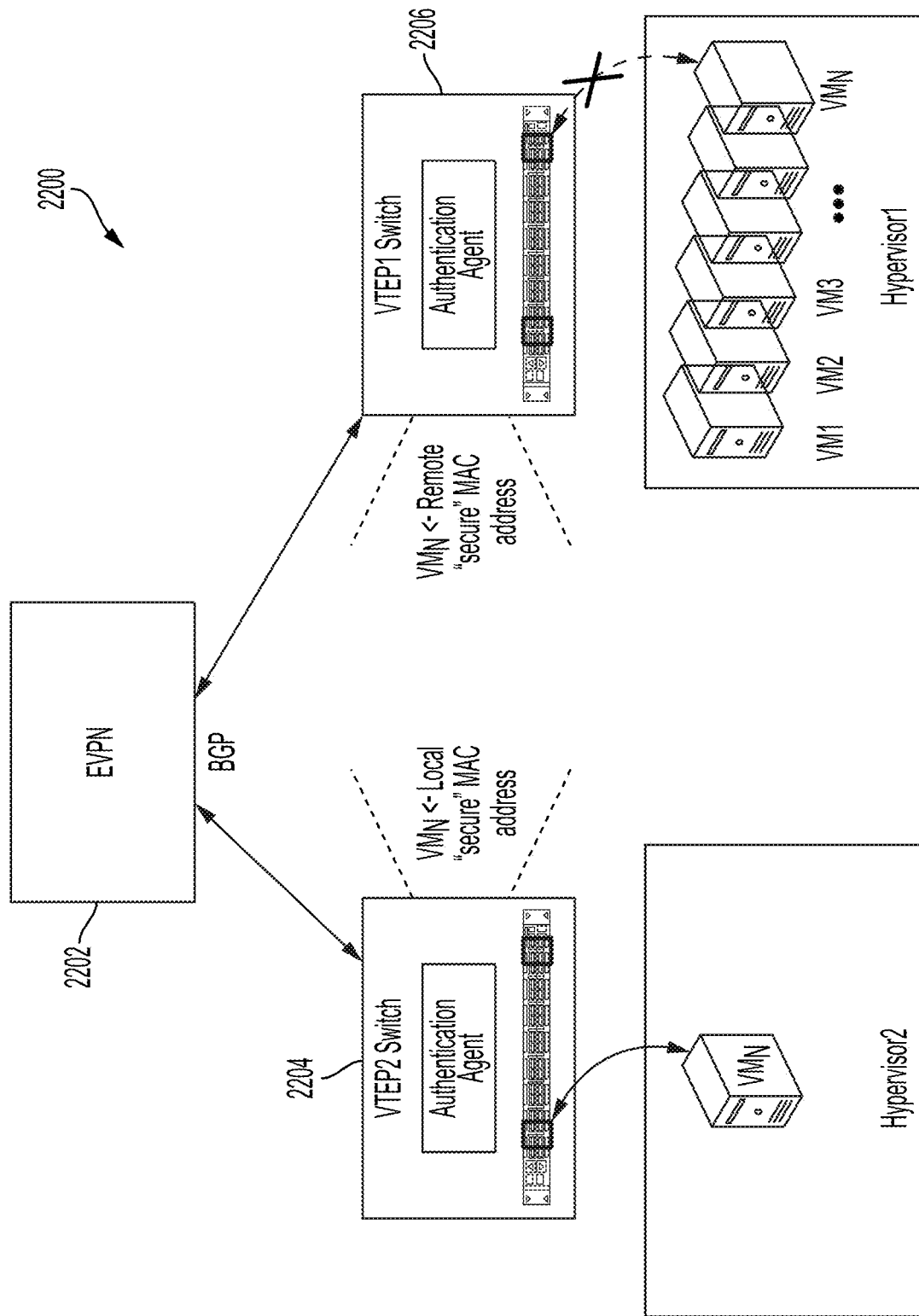

The corresponding MAC address of $VM_N$ is characterized as a "local" MAC address in forwarding table 1732, of FIG. 17, because $VM_N$ is authorized locally to VTEP 1714 for traffic forwarding whereas upon completion of the $VM_N$ reauthentication and movement, as shown in FIG. 22, the MAC address associated with $VM_N$ will be a "remote" address to VTEP1 switch 1706 and a "local" address to VTEP2 switch 1704. In the example of FIGS. 16-22, as shown in FIG. 17, an entry of table 1732 includes an authenticated MAC address field for $VM_N$, a corresponding port number field, and a (route) Type field. The type field, in conventional techniques, typically identifies a characteristic of a corresponding advertised route, for example, as having a static or a dynamic address. Instead, in accordance with various embodiments and methods herein, the Type field shown in FIG. 17 includes authentication information corresponding to $VM_N$ to describe a corresponding advertised route in association with a particular type of authentication. In some embodiments, a value in the Type field of forwarding table 1732 entry, may identify a feature of a corresponding advertised route as a static, dynamic, or authentication conforming. The feature in the Type field in forwarding table 1732 may simply describe the corresponding authentication, for example, the 802.1x standard authentication.

In the particular example of FIG. 17, the depicted entry of forwarding table 1732 identifies a local secure MAC address associated with $VM_N$ with the value "$VM_N$", the port number onto which $VM_N$ connects through link 1718, "A", and a 802.1x authentication type associated with the secure MAC address, "802.1x". It is understood that each of the fields of forwarding table 1732 may include additional, fewer, or replacement information corresponding to the virtual machine $VM_N$.

Figure 18:
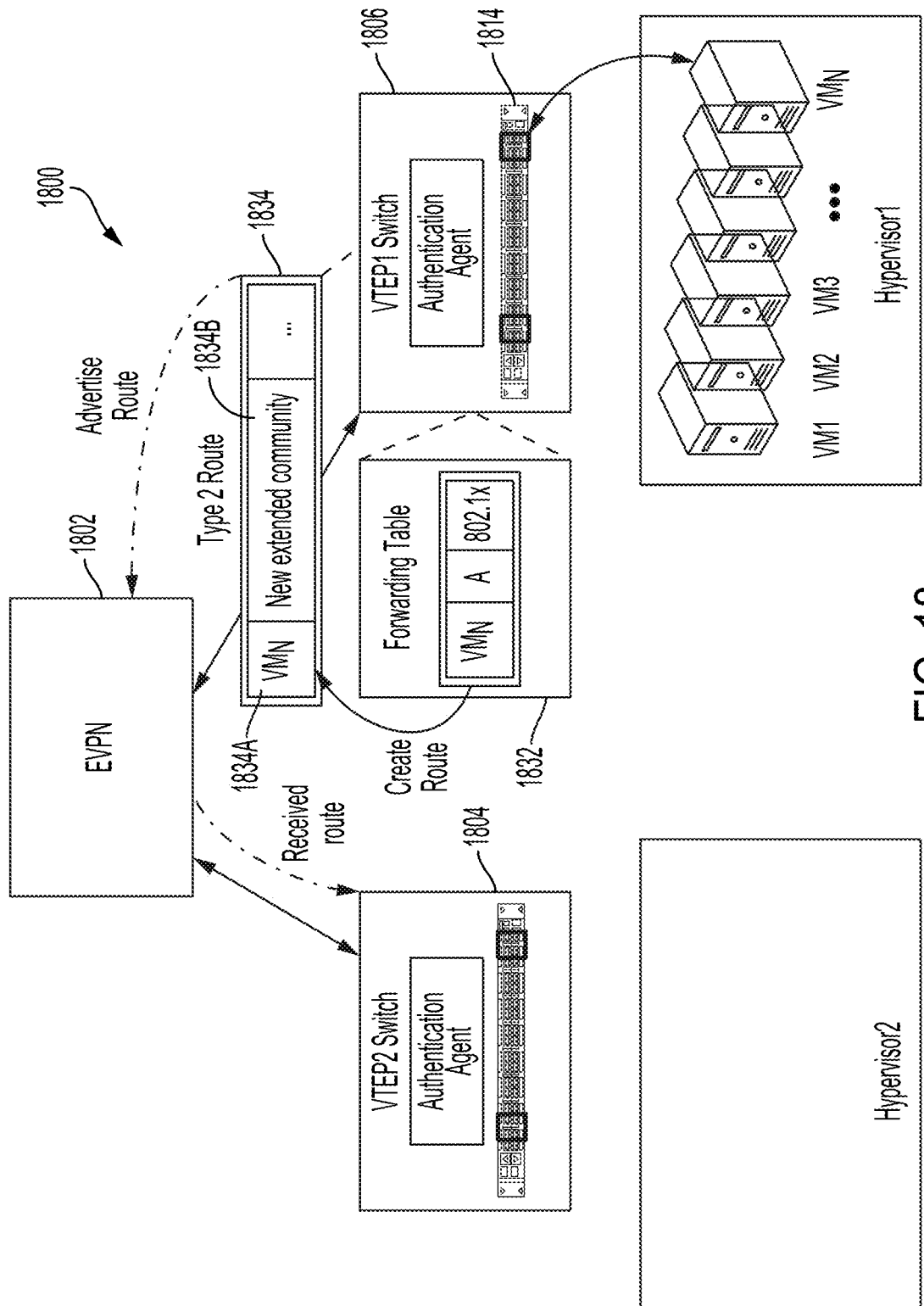

In FIG. 18, a route process of VTEP1 switch 1806 builds a payload 1834 based on the depicted entry of table 1832 for advertising a corresponding route through EVPN 1802. In an example embodiment, payload 1834 is a Type 2 route. In some embodiments and methods, VTEP1 switch 1806 creates a route, based on payload 1834, that includes a new extended community field 1834B identifying $VM_N$ as denoted in an address field 1834A of payload 1834. VTEP1 switch 1806 may base, at least in part, the new extended community in field 1834B on the information in the Type field of the depicted entry of table 1832. In some embodiments and methods of the disclosure, the new extended community of payload 1834 includes information relating to the authenticated address in field 1834A of payload 1834. Fields 1834A and 1834B are generally a part of the header information of a corresponding advertised route and may be but a couple of fields of several fields of payload 1834 and a corresponding created route, not all of which are shown in FIG. 17. In some cases, route 1834 includes a mac mobility community, or not. If $VM_N$ has been previously learned somewhere else, route 1834 may include a MAC mobility community, otherwise, route 1834 may not include a MAC mobility community. In some embodiments, packets of an advertised route may be VXLAN-, MPLS-, GRE-, or CAPWAP-encapsulated. The encapsulated packets may be further encapsulated with the header information of payload 1834, particularly field 1834B for $VM_N$ authentication messaging to VTEP2 switch 1804. For example, a VXLAN header may include a VXLAN network identifier (VNI)

used to uniquely identify a corresponding VXLAN. MPLS may encapsulate the advertised route packets based on a corresponding network protocol. An example of a new extended community is provided and discussed relative to FIG. 25.

Figure 19:
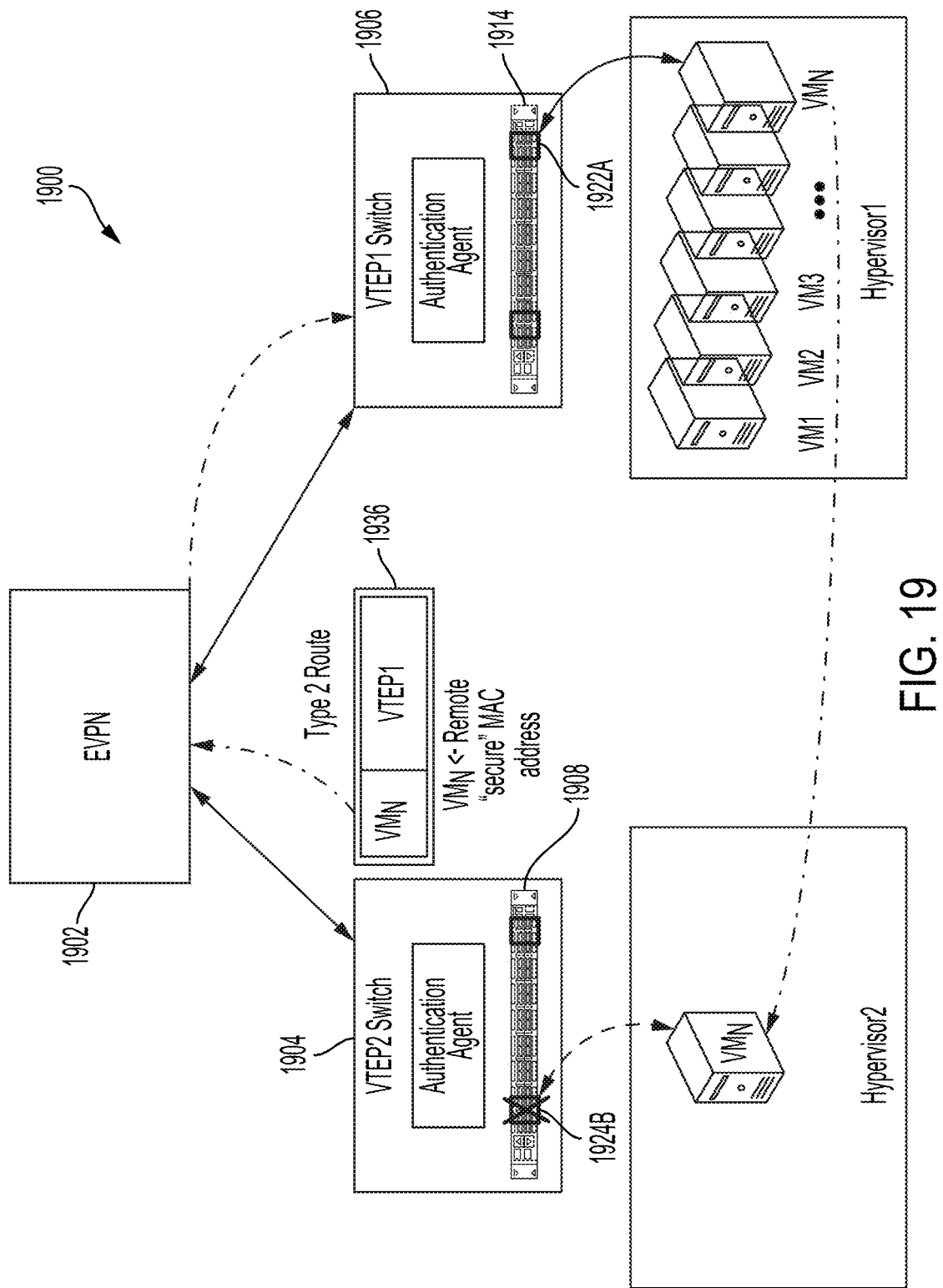

In some embodiments, VTEP2 switch 1804 may receive the advertised route, through EVPN 1802, into a corresponding border gateway protocol (BGP) process for processing. For example, the received route may undergo a best path process. The received route may undergo further suitable processes. VTEP2 switch 1804 may decapsulate the received route and generate a forwarding table entry based on the received BGP route, an entry corresponding to $VM_N$. VTEP2 switch 1804 is made aware of $VM_N$ pre-authentication at VTEP 1814 by virtue of the received route carrying new extended community, accordingly, VTEP2 switch 1804 knows $VM_N$ is 802.1x-compliant and a reauthentication process can begin. Prior to the start of a $VM_N$ reauthentication process however, in some embodiments and methods of the disclosure, VTEP2 switch 1904 acknowledges that the control of the $VM_N$ corresponding (secure) MAC address lies with VTEP1 switch 1906 treating the MAC address as a remote address. As shown in FIG. 19, VTEP2 switch 1904 forwards an authentication acknowledgement (route) 1936 through EVPN 1902 to VTEP1 switch 1906, accordingly. In Some embodiments, route 1936 is a Type 2 route. All the meanwhile, $VM_N$ is blocked from reliable traffic forwarding on port 1924B of VTEP 1908 of VTEP2 switch 1904 and remains authenticated at port 1922A of VTEP 1914 of VTEP1 switch 1906.

Figure 20:
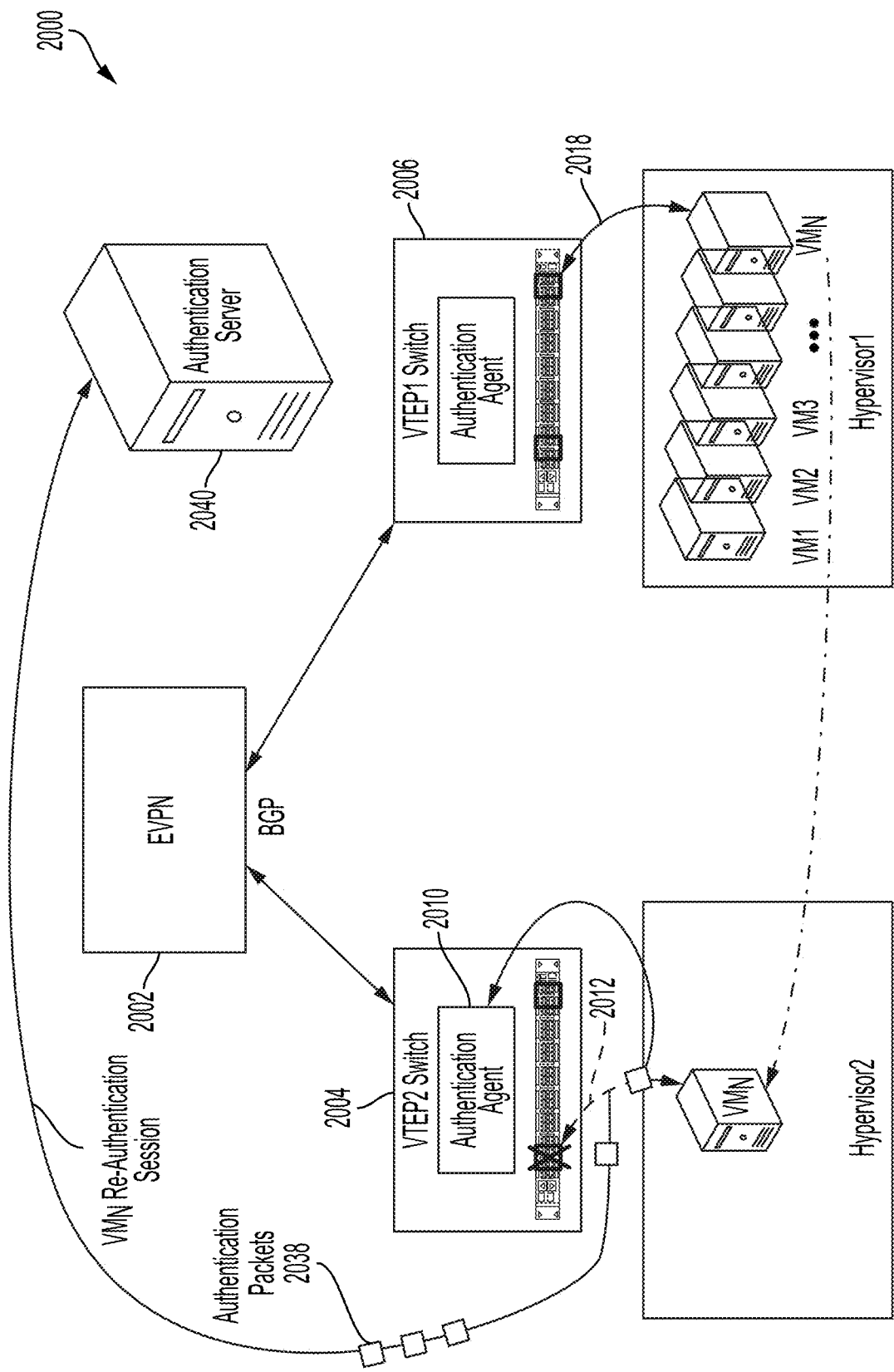

$VM_N$ reauthentication is shown, in relevant part, in FIG. 20 where authentication agent 2010 of VTEP2 switch 2004 intercepts authentication packets 2038, initially headed for port 1924B of VTEP 1908, from $VM_N$, and re-directs the authenticated packets 2038 to an authentication server 2040, as described relative to prior figures. $VM_N$ then authenticates with authentication server 2040 in a new authentication session. Without such reauthentication, hardware entries of port 1924B on VTEP2 switch 1904 would reject non-authenticated packets from $VM_N$. Upon completion of authentication at VTEP2 switch 1904 however, the hardware entries recognize the authenticated packets from $VM_N$.

As previously noted, in an embodiment, a trigger for authentication of $VM_N$ at VTEP2 switch 1904 may stem from receiving authentication packets from $VM_N$. Conventionally, VTEP hardware processes receptive to regular network traffic packets (non-authentication packets) instead pass authentication packets onto a central processor for processing. In some disclosed method and embodiments, a VTEP authentication agent views this as an opportunity to perform soft authentication. With continued reference to FIG. 20, authentication agent 2010 of VTEP switch 2004 intercepts and redirects the $VM_N$-sourced authentication packets. But non-authenticated packets from $VM_N$ remain blocked.

In response to successful authentication of $VM_N$ at VTEP2 switch 2004, in FIG. 20, VTEP2 switch 2004 takes over the secure MAC address corresponding to $VM_N$ and updates a message to VTEP2 switch 2006 accordingly. In some embodiments, VTEP2 switch 2004 may update the message by a route 2142 (FIG. 21) back to VTEP1 switch 2006, through EVPN 2002, to announce the address takeover. This is shown in FIG. 21 with route 2142 originating from VTEP2 switch 2104 to VTEP1 switch 2106. With continued reference to FIG. 21, in some embodiments, route 2142 is a Type 2 route. Route 2142 may include the secure MAC address, which is now local to VTEP2 switch 2104, "$VM_N$", a MAC mobility extension, and an authenticated community, as shown in FIG. 21. In implementations using BGP type 2 routes, the routes include a VNI, MAC address, and the VTEP used to communicate with the routes. The first type 2 route that is sent out for a given VNI and MAC address generally includes the foregoing information in addition to the authentication community, assuming such authentication has taken place. Any device that wants to take over a given VNI and MAC address must add the MAC mobility community at this point. In some embodiments, the payload in route 2142 may further include a sequence number generated by incrementing a prior sequence number by one. The prior sequence number corresponds to the last update to the MAC address accompanying the advertised route from VTEP2 switch 2104 to indicate an update (takeover) to the MAC address. In some cases, if route 1834 had a MAC mobility community, the sequence number of route 2142 would need to be higher than that of route 1834 and if route 1834 did not have a MAC mobility community, the sequence number of route 2142 would be "1". In response to receiving route 2142 through EVPN 2102, VTEP 1 switch 2206 disregards the old authentication, blocks port 2122A at VTEP1 2114, and programs an entry (or replaces the old entry) for host ($VM_N$) pointing the $VM_N$ secure MAC address to VTEP2 switch 2104. The $VM_N$ secure MAC address is now remote to VTEP1 switch 2106, and local to VTEP2 switch 2204, as shown in FIG. 22. $VM_N$ has completed its desired move from Hypervisor1 to Hypervisor2. Notably and as previously discussed relative to the tables of FIGS. 12A-12F, VTEP2 switch 2206 maintains the $VM_N$ authentication at port 2122A until receipt and processing of route 2142. Although, for a brief period, VTEP2 switch 2204 and VTEP1 switch 2206 are out of synchronization relative to the authentication of $VM_N$, this momentary event is resolved when VTEP1 switch 2206 removes authentication to port 2122A.

FIGS. 23-24 are flow charts of a virtual machine move reauthentication process, in accordance with some embodiments of the disclosure. In FIG. 23, process 2300 includes example process steps for achieving host-to-host virtual machine movement. In some embodiments, process 2300 is implemented by processor circuitry 206 of FIG. 2. Process 2300 starts at step 2302 where a reauthentication indication of a virtual machine at a second network device (e.g., a destination host) of a remote network is received by a first network device (e.g., source host) of a virtual network of a local network. In an embodiment, the virtual machine of FIG. 11 is an example of a virtual machine of process 2300. At step 2306, a payload, carried by an advertised route including an authentication (community) extension through the virtual network is advertised to the second network device for authentication of the virtual machine at the second network device, such as discussed relative to the payload and advertised route of FIG. 18. Next, at step 2308, a determination is made as to whether or not a new authentication (or reauthentication) session is to begin based, for example, on receipt of authentication packets from the virtual machine, as discussed with reference to FIGS. 11-22. In response to the determination yielding a positive result, process 2300 proceeds to step 2402 of FIG. 24, otherwise, process 2300 proceeds to step 2310.

At step 2310, the virtual machine remains authenticated at the first network device and blocked at the second network deice and process 2300 ends. Essentially, the virtual machine movement attempt fails. At step 2402 of FIG. 24, an authentication acknowledgement is received by second network device via an advertised route, such as route 1936 of FIG. 19. In some embodiments, the second network device initiates reauthentication by sending a request to an independent authentication server and waits for the virtual machine to re-authenticate itself at the second network device with the authentication server before step 2404 is implemented. At step 2404, the first networking device blocks the virtual machine from forwarding traffic to the first network device but network traffic is freely forwarded through the second network device and at step 2406, the first network device removes the local secure MAC address entry pointing to first network device (corresponding to virtual machine) and adds a remote secure MAC address entry pointing to second network device.

It is understood that although a particular order and flow of steps of processes is depicted in each of FIGS. 9, 10, 13, 14, 15, 23, and 24, it will be understood that in some embodiments one or more of the steps of each process may be modified, moved, removed, or added, and that the process flow depicted in FIGS. 9, 10, 13, 14, 15, 23, and 24 may be modified accordingly.

FIG. 25 shows an example structure of an authentication extension, in accordance with various embodiments of the disclosure. In some embodiments, the extension of FIG. 25 is an extension for an EVPN extended community. The extension structure of FIG. 25 is specifically tailored for the 802.1x standard and flexibly programmable. The extension may be conveniently applied to other industry standards authentication protocol standards. In some embodiments, the extension of FIG. 25 is a header encapsulation of an advertised route, such as from a source host or a destination host. For example, the advertised route from VTEP1 switch 1806 to VTEP2 switch 1804, in FIG. 18 and the advertised route from VTEP2 switch 1904 to VTEP1 switch 1906, in FIG. 19. The new extended community includes various fields such as a Type field, a Sub-Type field, an Authentication field, and a Reserved field.

As shown in FIG. 25, the Type field is indicative of a community, for example, represented by the type value "6". The Sub-Type field is indicative of the authentication type, for example, a sub-type value "0x13" represents the 802.1x standard authentication type. The Authentication field is indicative of an 802.1x-compliant (secure) corresponding MAC address accompanying the extension The Reserved field is maintained for future attribute additions. It is understood that the authentication field and remaining fields of the new extended community may have different fields or different values representing different fields. For example, the Sub-Type field may be assigned a value to represent a MAC address WIFI authentication type compliance and a value different than "13" may designate an 802.1x authentication compliance.

It will be apparent to those of ordinary skill in the art that methods involved in the present invention may be embodied in a computer program product that includes a computer-usable and/or -readable medium. For example, such a computer-usable medium may consist of a read-only memory device, such as a CD-ROM disk or conventional ROM device, or a random-access memory, such as a hard drive device or a computer diskette, having a computer-readable program code stored thereon. It should also be understood that methods, techniques, and processes involved in the present disclosure may be executed using processing circuitry.

The processes discussed above are intended to be illustrative and not limiting. More generally, the above disclosure is meant to be exemplary and not limiting. Only the claims that follow are meant to set bounds as to what the present invention includes. Furthermore, it should be noted that the features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real-time. It should also be noted, the systems and/or methods described above may be applied to or used in accordance with other systems and/or methods.

What is claimed is:

1. A method of authenticating an intra network device between inter network devices of a network comprising:
provisionally authenticating an intra network device of a network through an authentication agent executing on a processor of a switch device with a plurality of switch device ports, the intra network device authenticated to communicate with remaining network devices of the network through a first switch device port of the plurality of switch device ports through a physical link coupling the first switch device port to the intra network device, the provisionally authenticating comprising:
while a second switch device port of the plurality of switch device ports to the network device remains blocked, preventing the intra network device from communicating with the remaining network devices through the second switch device port, intercepting one or more authentication packets from the intra network device through the second switch device port, the authentication packets directed to an authentication host device by the intra network device for authenticating the intra network device to communicate with the remaining network devices at the second switch device port; and
forwarding the authentication packets intercepted from the intra network device to the authentication host device for authentication of the intra network device at the second switch device port;
in response to receiving an acknowledgment from the authentication host device of the authentication of the intra network device to communicate with the remaining network devices at the second switch device port, removing blocking of the second switch device port to allow communication of non-authentication packets between the intra network device and the remaining network devices at the second switch device port; and
maintaining associations between authenticated intra network devices of the network, including the intra network device, and corresponding switch ports of the switch in a forwarding table.

2. The method of claim 1, wherein the forwarding table includes an association between the intra network device and the first switch device port until after the intra network device is authenticated at the second switch device port.

3. The method of claim 2, further comprising in response to authentication of the intra network device, removing the association between the intra network device and the first switch device port from the forwarding table.

4. The method of claim 1, further comprising in response to receiving the acknowledgment from the authentication host device of authentication of the intra network device at the second switch device port, updating an association in an forwarding table between the intra network device and the first switch device port to an association between the intra network device and the second switch device port.

5. The method of claim 1, further comprising in response to authentication of the intra network device at the second switch device port, blocking communication of non-authentication packets between the intra network device and the remaining network devices through the first switch device port.

6. The method of claim 1, further comprising establishing a second link between the intra network device at the second switch device port in response to authentication of the intra network device at the second switch device port.

7. The method of claim 1, wherein the authentication agent executing on the processor causes authentication of the intra network device at the second switch device port in accordance with a network security protocol.

8. The method of claim 1, further comprising:
receiving an authentication notification from the intra network device to communicate through the second switch device port; and
in response to authentication of the intra network device at the second switch device port, allowing the intra network device to communicate with the remaining network devices at the second switch device port.

9. The method of claim 8, further comprising performing the removing of blocking at the second switch device port only in response to the authentication notification from the intra network device at the second switch device port to prevent network device packet loss.

10. An inter network device for authenticating an intra network device of a network, the inter network device including a plurality of inter network device ports and comprising:
memory configured to store a program code; and
a processor that when executing the program code causes the inter network device to provisionally authenticate the intra network device at a second inter network device port of the plurality of inter network device ports, while the intra network device is already authenticated at a first inter network device port of the plurality of inter network device port, using an authentication agent by causing the inter network device to:
while blocking the second inter network device port from communicating with remaining network devices of the network at the second inter network device port, intercept one or more authentication packets from the intra network device at the second inter network device port, the authentication packets directed to an authentication host by the intra network device for authenticating the intra network device to communicate with the remaining network devices,
in response to the inter network device intercepting the authentication packets, forward the authentication packets to the authentication host for authentication of the intra network device at the second inter network device port, and
in response to receiving an acknowledgment from the authentication host of the authentication of the intra network device to communicate with the remaining network devices at the second inter network device port, remove the blocking to allow communication of non-authentication packets between the intra network device and the remaining network devices at the second inter network device port.

11. The inter network device of claim 10, wherein the processor when executing the program code further causes the inter network device, in response to the authentication of the intra network device at the second inter network device port, to remove an authentication of the intra network device at the first inter network device port and block communication between the intra network device and the remaining network devices at the first inter network device port.

12. The inter network device of claim 11, wherein to remove the authentication of the intra network device at the first network device port, the inter network device is configured to remove an association between the intra network device and the first inter network device port from a forwarding table.

13. The inter network device of claim 10, wherein in response to the authentication of the intra network device at the second inter network device port, the inter network device is configured to add an association between the intra network device and the second inter network device port to a forwarding table.

14. The inter network device of claim 10, wherein the inter network device is configured to remove the block at the second inter network device port only after authentication of the intra network device at the second inter network device port to prevent network device packet loss.

15. The inter network device of claim 10, wherein the inter network device is configured to receive an acknowledgement from the authentication host indicative of the authentication of the intra network device at the second inter network device port.

16. The inter network device of claim 15, wherein the inter network device is configured to remove an association in a forwarding table between the intra network device and the first inter network device port in response to receiving the acknowledgement from the authentication host.

17. The inter network device of claim 10, wherein the inter network device is configured as a physical network switch.

* * * * *